(12) United States Patent
Fritze

(10) Patent No.: US 11,534,707 B2
(45) Date of Patent: Dec. 27, 2022

(54) ELECTRICALLY ENHANCED FILTER CARTRIDGE AND METHODS FOR ITS USE

(71) Applicant: PARAGON WATER SYSTEMS, INC., Tampa, FL (US)

(72) Inventor: Karl J. Fritze, Hastings, MN (US)

(73) Assignee: PARAGON WATER SYSTEMS, INC., Tampa, FL (US)

( * ) Notice: Subject to any disclaimer, the term of this patent is extended or adjusted under 35 U.S.C. 154(b) by 153 days.

(21) Appl. No.: 17/030,016

(22) Filed: Sep. 23, 2020

(65) Prior Publication Data

US 2021/0077927 A1    Mar. 18, 2021

Related U.S. Application Data

(63) Continuation of application No. 15/837,413, filed on Dec. 11, 2017, now Pat. No. 10,786,768, which is a continuation of application No. 13/161,131, filed on Jun. 15, 2011, now Pat. No. 9,839,868.

(60) Provisional application No. 61/355,006, filed on Jun. 15, 2010.

(51) Int. Cl.
*B01D 35/06* (2006.01)
*B01D 35/153* (2006.01)
*C02F 1/469* (2006.01)
*C02F 1/461* (2006.01)

(52) U.S. Cl.
CPC ........... *B01D 35/153* (2013.01); *B01D 35/06* (2013.01); *C02F 1/4691* (2013.01); *B01D 2201/302* (2013.01); *C02F 2001/46133* (2013.01); *C02F 2201/003* (2013.01); *C02F 2201/004* (2013.01); *C02F 2201/006* (2013.01); *C02F 2303/04* (2013.01)

(58) Field of Classification Search
CPC .............................. B01D 35/06; B01D 35/153; B01D 2201/302; C02F 1/4691; C02F 2001/003; C02F 2001/004; C02F 2001/006; C02F 2001/46133; C02F 2303/04
See application file for complete search history.

(56) References Cited

U.S. PATENT DOCUMENTS

| | | |
|---|---|---|
| 3,616,356 A | 10/1971 | Roy |
| 4,007,113 A | 2/1977 | Ostreicher |
| 4,382,866 A | 5/1983 | Johnson |
| 4,941,962 A | 7/1990 | Inoue |

(Continued)

OTHER PUBLICATIONS

Application and File history for U.S. Appl. No. 13/161,131, filed Jun. 15, 2011. Inventor: Fritze.

(Continued)

*Primary Examiner* — Patrick Orme
(74) *Attorney, Agent, or Firm* — Greer, Burns & Crain, Ltd

(57) ABSTRACT

A fluid treatment apparatus and related methods involving the use of replaceable treatment cartridges that include a treatment media, wherein the treatment cartridge is electrically enhanced to form regions of differing polarity within the cartridge. The treatment cartridge can include a pair of fixed polarity conductors that can be electrically connected to a power source so as to induce regions of differing polarity within the cartridge. The fluid treatment apparatus can be utilized to treat liquids including aqueous solutions as well as gases such as an air supply by exposing the fluid to the regions of differing polarity.

20 Claims, 21 Drawing Sheets

(56) References Cited

U.S. PATENT DOCUMENTS

| | | |
|---|---|---|
| 5,164,091 A | 11/1992 | Huber et al. |
| 5,281,330 A | 1/1994 | Oikawa et al. |
| 5,514,391 A | 5/1996 | Bushnell et al. |
| 6,193,884 B1 | 2/2001 | Magnusson et al. |
| 6,332,960 B1 | 12/2001 | Monteith |
| 6,673,321 B2 | 1/2004 | Weakly et al. |
| 6,689,262 B2 | 2/2004 | Senkiw |
| 7,112,272 B2 | 9/2006 | Hughes et al. |
| 7,293,661 B2 | 11/2007 | Saaski et al. |
| 7,622,025 B2 | 11/2009 | Polnicki et al. |
| 2002/0148722 A1 | 10/2002 | Hermann et al. |
| 2007/0251887 A1* | 11/2007 | Koos ............ B01D 61/18 210/663 |
| 2011/0042236 A1 | 2/2011 | Kim et al. |

OTHER PUBLICATIONS

Application and File history for U.S. Appl. No. 15/837,413, filed Dec. 11, 2017. Inventor: Fritze.

\* cited by examiner

FILTER INSERT OR REMOVE POSITION
FLUID IN RECIRCULATION

FILTER IN SERVICE POSITION
FLUID IN FILTRATION

ELECTRICALLY ENHANCED FILTER CARTRIDGE AND METHODS FOR ITS USE

RELATED APPLICATIONS

This application is a continuation of application Ser. No. 15/837,413, filed Dec. 11, 2017, which is a continuation of application Ser. No. 13/161,131, filed Jun. 15, 2011, now U.S. Pat. No. 10,786,768, issued Sep. 29, 2020, which claims priority to U.S. Provisional Application Ser. No. 61/355,006 filed Jun. 15, 2010 and entitled "ELECTRICALLY ENHANCED FILTER CARTRIDGE AND METHODS FOR ITS USE", each of which is hereby incorporated by reference in its entirety.

FIELD OF THE INVENTION

The present application relates to the field of fluid treatment of both gasses and liquids. More specifically, the present invention is directed to a treatment apparatus comprising a compact replaceable cartridge unit that increases the capacity of its treatment media, broadens its range of target contaminants, and increases the rate of treatment kinetics by employing an external bias voltage. The present application is directed to various representative devices and related methods of employing this technology.

BACKGROUND OF THE INVENTION

The treatment of fluids, both gases and liquids is well known and extensively practiced today. For example, filtration devices and their associated filtration elements are widely utilized in commercial, industrial and residential applications. The media or filtration element is very often located in an enclosed container which allows a contaminated fluid to be directed into the container, contact the filtration element, and then a now filtered fluid is directed out of the container. An important advantage of having the filtration element enclosed within a suitable container is that the container often entrains or otherwise captures the filtered contaminants and a spent element can be disposed as a unitary package providing for clean, fast, safe, and easy replacement. Liquid filter cartridges are used in many industries, for example as blood filters in the medical industry, as oil filters in engines, as fuel filters in fuel lines and tanks, and as water filters in refrigerators. Examples of gaseous filter cartridges include for example; air filters in furnaces, masks and canisters that are used to purify breathing air in respirators, automotive intake and catalytic exhaust filters, refrigerator air filtration, and whole room HEPA filtration. The design of the various filtration media and cartridges are well understood for each industry and application.

The treatment and/or filtration of fluids can be classified into several methodologies. Chemical treatments such as oxygenation, chlorination, and pH modification require the addition of chemicals to treat the fluid so as to change the nature of the contaminants allowing their inactivation or changing their morphology to enable subsequent mechanical filtration. Biological filtration uses microbes to convert the target contaminant into a form which either renders it safe, or binds it for subsequent mechanical filtration. Mechanical filtration, which is the most common type, can be classified by the physical size of the contaminant to be removed. Traditional particle filtration can be used on particle sizes ranging from as high as 1000 microns down to 1 micron in size and includes contaminants such as, for example, sand, pollen, yeast, cysts, bacteria, pigments, and fine dust. A sand filter or spun polypropylene elements are representative of traditional particle filters. Filtering anything smaller than 1 micron typically involves porous hollow-fiber tubes or specialized membranes. Microfiltration ranges from 2 microns to 0.05 microns and can be utilized to target contaminants such as, for example, asbestos, smoke, and pigments. Ultrafiltration deals with the larger molecular level and ranges from 0.11 microns to 0.004 microns and can be utilized to remove contaminants such as, for example, carbon black, colloidal silica and viruses. Nanofiltration includes the smaller molecular level and includes particle size ranges from 0.009 microns to 0.0008 microns and can remove contaminants such as, for example, endotoxins, synthetic dyes, and sugars. Hyperfiltration has its domain in the ionic and atomic region from 0.0015 microns to 0.0001 microns (1 angstrom unit) and can include contaminants such as, for example, metal ions and salt. Reverse osmosis membranes can operate in the hyperfiltration range.

Mechanical filtration generally requires that the pore size of the media or element is smaller than the target contaminant. There are special challenges to using membranes having very small pore sizes as these membranes are easily fouled, have limited surface area and minimal capacity. Using multiple stages of pre-treatment or frequent backwashing extends the life of these membranes at the expense of complexity, cost, and wasted water. Moreover, many membrane systems operate at low flow rates and require very large membrane areas, high pressure supply pumps and/or storage reservoirs to provide usable amounts of water. An additional disadvantage to using membrane filtration is that that because the filtered water is usually stored in reserve, it can support microorganisms which often foul the stored water and storage tank thus requiring additional filtration and or disinfection steps prior to use.

Another commonly used filtration technology is ion exchange which uses a positively charged resin (anion) or negatively charged resin (cation) to exchange one type of ionic contaminant for another. The most common example, a home water softener, uses a cationic resin which is initially saturated with sodium ions. When water containing dissolved ions such as magnesium and/or calcium is brought into contact with the sodium saturated cation resin, the more preferable calcium or magnesium cations are electrostatically bound to the resin and traded for sodium ions which are then released back into the water. Cationic resins target cations which are contaminants with a positive charge including transition metals such as calcium, magnesium, iron, aluminum, copper, mercury etc. Anionic resins target anions which are contaminants with a negative charge such as carbide, chloride, fluoride, oxide, sulfide etc. Even though ion exchange systems are well understood and quite common, they require backwashing and re-charging to maintain effective operation. The additional mechanisms and chemicals required to effectively employ ion exchange adds considerable cost and size for a suitable system. Additionally, while ion exchange resins can be used in replaceable cartridges, their cost is relatively high while possessing a generally low capacity for holding contaminants. As such, replaceable ion exchange cartridges have not found widespread economic success in the marketplace.

One particular replaceable filtration cartridge niche that has shown remarkable economic success and widespread use is in the water filtration systems of many refrigerators. In 1996, KX industries, was the first to introduce a water filter for use with a refrigerator. By 1998, most domestic refrigerator manufactures were offering integrated replaceable water filter systems. U.S. Pat. No. 6,193,884 to Magnusson et al. teaches the use of a replaceable water filter suitable for use in an appliance. These early water filters typically employed carbon granules and were capable removing chlorine, some organics, and were able to reduce turbidity from water to improve its taste and clarity. Advances in carbon block technology today utilize a polymeric sintered matrix of ultrahigh molecular weight polyethylene with very fine powdered activated carbon and specialized additives such as amorphous titanium silicate (ATS). U.S. Pat. No. 7,112,272 to Hughes et al. discloses using two special PE polymers and vibration sintering to produce a very efficient, structurally robust, and high performing filtration element. U.S. Pat. No. 7,293,661 to Saaski et al., discloses a 2-part binder agglomerated particle using UHMW-PE and activated carbon. These types of carbon and polyethylene filtration elements are now capable of removing 98% of volatile organic compounds, 97% of chlorine, 99% of lead, 96% of mercury, 99% of asbestos, 99.99% of cysts, 99% of lindane, and 74% of atrazine while flowing at 0.6 gpm for 160 gallons as listed by NSF, which is very respectable considering their very small size. However, federal, state, and local governments are continuing to impose stricter regulations on maximum contamination limits to an ever growing list of toxic contaminants.

Many specialized water treatment systems are capable of targeting difficult contaminants such as perfluorochemicals (PFC), particularly perfluorooctanoic acid (PFOA) and perfluorooctane sulfonate (PFOS), chlorine byproducts such as trihalomethanes (THM), nitrogen-oxygen compounds nitrate and nitrite, and heavy metals such as antimony, arsenic, bismuth, cadmium, cerium, chromium, cobalt, copper, gallium, gold, iron, lead, manganese, mercury, nickel, platinum, silver, tellurium, thallium, tin, uranium, vanadium, and zinc, and even naturally occurring radionuclide's such as uranium, plutonium, radon, and radioactive fallout such as thorium, barium, cerium, caesium, tellurium, ruthenium, molybdenum, strontium, lanthanum, and iodine. However, it is has been very difficult to provide a simple, low-cost filter cartridge to reduce many of these contaminants in meaningful amounts. A recent study according to the Associated Press has disclosed that over 56 different prescription drugs like psychoactive anti-anxiety medications, pain medications, sex hormones, and antibiotics etc. have been found in over 24 major metropolitan area water supplies. It is very difficult and expensive to reduce these and other contaminates to acceptable levels in an economical replaceable filter cartridge.

Electrical interactions play a large role in chemical activity and can be utilized to assist or promote fluid treatment. The oxidation or reduction of a chemical or molecule is a transfer of electrons from one atom to another. It can be said that the oxidation of iron (iron loses electrons) is also the reduction of oxygen (oxygen gains electrons). This process is often called redox and can be measured in terms of a redox potential or voltage. As iron is dissolved (reduced) into water it forms what is called clear-water or ferrous iron as it gains electrons.

$$Fe \rightarrow Fe2{++}2e-$$ (Iron Reduction)

As iron is oxidized, it precipitates into a larger red-oxide colored molecule as it loses electrons.

$$4Fe^{2+}O^2 \rightarrow 4Fe^{3+}+2O^{2-}$$ (Iron Oxidation)

These interactions and reactions involve atoms, molecules, and chemicals that are considered ions because they have either a net loss of electrons, or a net surplus of electrons. Ions are by definition polar and have a distinct electrical charge. An ion that has extra electrons is negatively charged, while an ion that is deficient in electrons has a net positive charge. It is worth noting that almost all pathogenic microbes are positively charged. For example, when sodium chloride salt is dissolved into water, it becomes sodium cation and chlorine anions.

Chlorine bleach or sodium hypochlorite is often used to treat organics which contaminate water. It is well known that a certain concentration of available chlorine (ppm) will destroy a certain amount of bacteria within a known amount of time. What is less understood is that the available chlorine in ppm is also equal to a redox potential or voltage of approximately 0.69 volts. In other words, the electrical potential of the liquid is changed by the addition of the bleach and has a new ability to steal electrons from substances dissolved in the water such as the bacteria. The use of a redox meter can be used to determine the ability of a liquid to oxidize a substance. Further, it matters little to the substance being treated if the redox potential is the result of bleach, acid, hydrogen peroxide, ozone and fluorine or an induced voltage. The ability of the liquid to steal electrons is based on the voltage between the liquid and the voltage of a newly introduced species.

A Chart of the Relative Values in Volts Oxidation-Reduction

| Chemical | Symbol | OPR Relative Value |
|---|---|---|
| Fluorine | F | 2.25 |
| Hydroxyl Radical | OH | 2.05 |
| Oxygen (Atomic) | O1 | 1.78 |
| Ozone | O3 | 1.52 |
| Hydrogen Peroxide | H2O2 | 1.30 |
| Permanganate | KMn2 | 1.22 |
| Hypochlorous Acid | H2CL | 1.10 |
| Chlorine (Gas) | CL | 1.00 |
| Oxygen (molecular) | O2 | 0.94 |
| Sodium Hypochlorite | NaCL2 | 0.69 |
| Bromine | Br | 0.57 |

Ion exchange resins filter fluids with these same electrical reactions because the plastic resin which is normally a cross-linked polystyrene bead, has been doped with a charged molecule (functional group) such as quaternary ammonium or divinyl-benzine to give the resin beads a lasting charge or voltage without external bias.

Electrolysis is also another process by which contaminants can be both chemically and physically altered to facilitate mechanical filtration. During electrolysis, a bias voltage is placed across two electrodes immersed in the treatment fluid which is called an electrolyte. The fluid must have some number of ionic contaminants such that the fluid can become electrically conductive. Dissolved salts allow electrons to be conducted between the cathode and anode.

When these electrodes are connected to each other, galvanic corrosion can occur which is common in boats with marine drives in sea water. When the electrodes are connected to an external bias voltage such as from a battery, the galvanic process can be augmented or reversed based upon the polarity of the electrodes and electrode materials. Galvanic interaction can cause metals to come out of solution or plate onto electrodes. The electrodes can be of any suitable conductive material such as carbon, graphite and metals.

Electrodialysis (ED) is a specialized and complex system in which membranes are used to separate fluid streams of anodic and cathodic fluids to transport salt ions from one solution through ion-exchange membranes to another solution under the influence of an applied electric potential difference. It can be likened to reverse osmosis with electrolysis. Another method employing membranes is electrodeionization (EDI) where membranes and ion exchange resins are used to separate the water into anodic and cathodic concentrates which form a waste stream to be discarded or recirculated. This system is likened to mixed-bed DI with electrolysis. These systems are effective, but are also slow in operation and costly to purchase and maintain and go beyond the economics of this application being best suited for laboratory, microelectronics, pharmaceutical, and industrial processing of ultra-pure fluids.

When water is subjected to electrolysis, the electron transfer process disassociates the $H_2O$ molecule into namely oxygen and hydrogen gasses. These gases dissolve into the water and can even super saturate the water as disclosed in U.S. Pat. No. 6,689,262 to Senkiw. Oxygenated water can be used to precipitate metals such as iron, manganese and even arsenic. Further, the electrolysis of water produces a wide range of transient high-energy chemical hybrids and interactions which can instantly precipitate dissolved metal. These electrolytic reactions produce atomic oxygen ($O^1$) and atomic hydrogen ($H^1$) which eventually lower their energy state to $O^2$ and $H^2$ as they pair and become stable. Additionally, ozone, hydrogen peroxide, hydrogen and hydroxyl radicals are understood to exist in transient stages which interact aggressively with contaminants in the water. For example, metal ions such as ferrous iron can enlarge 4-5 orders of magnitude from 0.0005 micron size of the dissolved ionic metal into a precipitated particle size of 1 to over 50 microns. Electrolysis can be used to liberate additional gasses such as chlorine from ionic chlorides dissolved into water also and can be beneficial to purify microbiological contaminants in the manner that swimming pool chlorinators work.

There is another electrical phenomenon which is involved with colloidal suspensions. A voltage exists between suspended particles in a colloid and their dispersion medium (water). This electrical voltage is called the zeta potential and measures the repulsion between particles such that they will remain separated and not coalesce into a larger agglomeration. When colloids are in the presence of a greater static electrical field, the zeta potential can be eliminated or altered such that the particles will coalesce into larger particles and become self clarifying by settling or becoming large enough to be removed by particle filtration. U.S. Pat. No. 4,007,113 to Ostreicher teaches the making of a filtering device by electrically modifying the zeta potentials using melamine-formaldehyde. Unfortunately, melamine-formaldehyde is not safely used for potable drinking water media.

There have been many different devices made that use one or more of these electrical processes to reduce contaminants in fluids, both gaseous and fluidic, but fail to accomplish the stated goal of providing a workable economic unitary package that allows for its clean, fast, safe, and easy replacement. U.S. Pat. No. 3,616,356 to Roy discloses an invention for the electrolytic treatment of water containing dissolved salts and metal oxides. The device placed planar electrodes opposite a bed of particulate carbon wherein a voltage of at least 1 volt was able to pass current of several amps between the carbon anode and steel cathode. The device was able to reduce dissolved metals by way of electrolysis and reclamation was by subsequent filtration of the fluid. This batch type device fails to provide continuous service and because of high current electrolysis, significant gasses will be generated and require their venting. Further, Roy teaches that using fine carbon powders defeats the purpose of the device because the metal pates to the carbon and cannot be easily removed.

In U.S. Pat. No. 4,941,962, Inoue discloses an invention for the electrostatic adsorptive treatment of fluids where he teaches a charged metallic housing electrode arranged opposite to an internal center electrode sleeve separated by an adsorbent filter media (carbon, zeolite, clay, activated alumina). A voltage is impressed across the outer housing and inner sleeve electrodes, from 1-20 VDC per cm. Inoue's invention claims that it manipulates and augments Coulomb forces which affect the charge between the impurity to be filtered and the surface of the adsorbent. Additionally, the device erases the zeta potentials of impurities as they pass by the charging electrode causing the particles to cohere together and settle. Those particles remaining are attracted by intensive Coulomb forces and are attracted to the holes of the adsorbent where they are retained until polarity reversal. Thus the Inoue device greatly increases both the strength and the capacity of the media adsorption. This device is an improvement over Ostreicher in that it is a flow-through housing, but falls short by not being an easily replaceable, low cost cartridge. However, it is Inoue's assertion that the use of an adsorbent which becomes saturated cannot be reused and must be thrown away, therefore requiring the reversal of polarity to release the contaminants and discharge them. The fact that contaminants remain on the saturated adsorbent are ideal for a replaceable filter cartridge which is in contrast to Inoue's device.

In U.S. Pat. No. 5,164,091, Huber et al., teaches how to remove metal ions in waste water by using an electrically conducting, cathodically polarized filter-aid layer whose potential is at least 50 mV more negative than the redox potential of the metal ions to be removed. The filter-aid layer is comprised of metal granules and carbon. Unfortunately, Huber's device requires ionic selective membranes and frequent backwashing for functionality. It is of particular interest however to define a minimum negative voltage to effectively interact with any particular metal ion.

Electrochemical Series for Some Metallic Ions as Referenced to Hydrogen

| Metallic Ion | $E°$ (volts) |
| --- | --- |
| Lithium | −3.03 |
| Potassium | −2.92 |
| Calcium | −2.87 |
| Sodium | −2.71 |
| Manganese | −2.37 |
| Aluminum | −1.66 |
| Zinc | −0.76 |
| Iron | −0.44 |
| Lead | −0.13 |
| Hydrogen (2H+) | 0.00 |
| Copper | 0.34 |
| Silver | 0.80 |
| Gold | 1.50 |

From the chart, a value of −3.03+50 mV [3.053 volts] would be sufficient to interact with lithium.

In U.S. Pat. No. 5,281,330, Oikawa et al., discloses a battery operated device with an electrically conductive filter within a water channel to suppress the breeding of microorganisms. The conductive filter is connected to a circuit board to carefully control the limited amount of battery power such that the device can last as long as possible and that one of the electrodes must be electrically insulated to eliminate any current flow. Particularly, the voltage is disabled during water flow because microorganisms do not typically breed as they are being flushed. Oikawa determined that a minimum of 0.7 volts was sufficient to stop the breeding of bacteria.

In U.S. Pat. No. 6,332,960, Monteith teaches a device to purify fluids, both liquid and gases by using a flow-through housing which has bolt-on flanges. While the device is removable, Monteith does not teach the need for easy low-cost replacement nor the use of adsorbents. Further, Monteith's device requires voltages in the kilovolt range, well beyond any safety for a residential filter cartridge use. However, Monteith's invention uses static electricity to charge inorganic particles such that they coalesce into spherical aggregates. Additionally, the electrostatic charge is effective in killing biological contaminants.

In U.S. Pat. No. 6,673,321, Weakly teaches the use of an apparatus that uses very high voltages (5000 volts) with only a trickle of current (0.5 to 3 mA) to enhance adsorption, polarization, ion exchange, and to agglomerate dissolved metal. Weakly impresses upon us that because the electrodes are insulated and the resulting current is so low, the process does not use electrolysis, but instead metals are captured by subsequent filtration by an adsorbent.

In U.S. Pat. No. 7,622,025, Polnicki discloses a system for decontamination of fluids using graphite, aluminum, or iron electrodes. Polnicki demonstrates that heavy metals such as arsenic, hydrocarbons, tensides (detergent agents), phosphates, chlorine aromatics and even bacteria are able to be removed by electrolytic activity. While iron is effective at conducting electricity, iron is very sacrificial and will not survive long due to galvanic and corrosive attack. Aluminum is also not recommended for potable water according to NSF. Graphite, as defined in this disclosure is 99% pure carbon but it is not activated such that it is intended for a filtration media. Activated carbon is highly porous and as such, has very large surface area.

In U.S. Patent Publication No. 2011/0042236 A1, Jae-eun Kim et. al. advances a drinking water filter unit that is able to sterilize microorganisms by applying an alternating polarity voltage to a filter layer using electrodes where the filter layer can be rolled into a spiral geometry. While Jae-eun Kim et al. teaches that a filter layer in a spiral geometry is an effective mechanism to enhance surface area and provide multiple polar regions, his teaching requiring that in all cases, the voltage be alternately reversed. Each time the poles are reversed, materials and contaminants entrapped onto the electrically enhanced media, are repelled and can be released causing bleed-through and downstream contamination.

While there exist many variations on fluid treatment systems, what is still needed is a low cost means to augment the capacity of filtration media, expand the number of contaminants that are possible to reduce, and increase the filtration kinetics while at the same time keeping the advantages of clean, fast, safe, and easy cartridge replacement.

SUMMARY OF THE INVENTION

This present disclosure is directed to fluid treatment involving the use of replaceable cartridges that include a treatment media, wherein the replaceable cartridge is electrically enhanced to form regions of differing polarity within the cartridge. The replaceable cartridge can include a pair of fixed polarity conductors that can be electrically connected to a power source so as to induce regions of differing polarity within the cartridge. In some embodiments, one or both of the fixed polarity conductors can be directly attached to the treatment media. In some embodiments, the fluid to be treated can be aqueous solutions, particularly water to be rendered potable. In yet other embodiments, the fluid to be treated can extend to other liquids and to gases, such as, for example, air utilized in a forced air heating or cooling system.

In one aspect, the present invention is directed to a replaceable treatment cartridge comprising an electrically enhanced treatment media. The replaceable treatment cartridge can include a housing enclosing a treatment media and a pair of fixed polarity conductors for inducing an electrical field within the housing so as to form two oppositely charged regions within the housing. The replacement treatment cartridge can include an end cap providing fluid inlets and outlets and for providing attachment to a manifold. In some embodiments, at least one of the fixed polarity conductors can be in electrical contact with the treatment media. In one representative embodiment, the treatment media can comprise filtration media such as, for example, spiral wound or depth filtration media such as activated carbon.

In another aspect, the present invention is directed to an electrically enhanced fluid treatment system comprising a manifold having fluid inlets and outlets and a replaceable cartridge having a treatment media and a pair of fixed polarity conductors, such that attachment of the replaceable cartridge to the manifold connects the fixed polarity conductors to a power source and the fixed polarity conductors induce an electric field within the replaceable cartridge to form two oppositely charged regions within the replaceable cartridge. In certain embodiments, the replaceable cartridge can be rotatably or axially attachable to the manifold. In some embodiments, the manifold can include a bypass valve, wherein an operation status of the bypass valve is dependent upon whether the replaceable cartridge is attached to the manifold. In some embodiments, the power source can comprise a battery mounted within the replaceable cartridge. In some embodiments, the electrically enhanced fluid treatment system can be mounted to an appliance such as, for example, a refrigerator.

In yet another aspect, the present invention can be directed to a method of treating a fluid that includes the step of directing a fluid to be treated through a cartridge including a treatment media and a pair of fixed polarity conductors. The method can further comprise supplying power to the pair of fixed polarity conductors such that an electrical field is induced within the cartridge to form two oppositely charged regions within the cartridge and wherein the fluid is exposed to the two oppositely charged regions. In some embodiments, the method can further comprise attaching the cartridge to an appliance such as by attaching a mounting manifold within the appliance followed by operably coupling the cartridge to the mounting manifold. In some embodiments, the method can further comprise attaching at least one of the fixed polarity conductors to the treatment media. In some embodiments, the step of supplying power to the pair of fixed polarity conductors creates a voltage potential of at least 0.5 volts between the two oppositely charged regions within the cartridge.

Representative electrically enhanced fluid treatment systems of the present invention can utilize electrical activity; static or dynamic, to affect Coulomb forces, zeta potentials, Van der Waals forces and electrolytic activity. These externally biased electrical forces cause reactions that can both; increase the strength of an existing treatment media to capture and hold contaminants beyond its normal ability, increase the capacity to hold these contaminates bound to the electrically enhanced filter media, and also increase the kinetics or rate of reaction of the filtering process allowing for higher flow rates without sacrificing contaminant reduction rates.

With respect to the variously described embodiments of the present invention involving the treatment of fluids, the treatment mechanism can comprise particle filtration including both absorption into a media and adsorption of particles onto a media. Further, particle filtration with electrically enhanced media of the present invention can take the form of barrier filtration wherein the particles become larger through the influence of electrical fields whereby they are prevented from passing through a medium. The electrical modification of the particulate geometry can also be used to precipitate or catalyze a reaction to form a new species of material having properties different than that of the parent species.

In certain other embodiments of the present invention, electrically enhanced treatment of fluids can include galvanic interaction with metallic species such as, for example, the plating or corroding of metals within an electrolyte. For example, an electrically enhanced treatment media can become plated with a targeted metallic species dissolved in a liquid by plating it onto the media. Conversely, fluids can be seeded with a particular metal when a sacrificial metallic media is properly polarized.

In yet other embodiments of the present invention, electrically enhanced treatment of fluids can include the disruption of colloids such that their particles can be aggregated into larger elements for subsequent treatment such as removal by filtration or harvesting.

In still other embodiments of the present invention, electrically enhanced fluid treatment can also include the molecular and atomic polarization of fluids and their constituents whereby electrically induced fields cause the attraction or repulsion of said fluids or their constituents resulting in their classification, separation, or collection.

In another embodiment of the present invention, electrically enhanced treatment of fluids a can effect microbiological organisms by their disinfection or growth inhibition. Further, electrically enhanced treatment of fluids can increase the local energy of the fluid for more aggressive chemical activity. The action of fluid electrolysis can evolve gaseous species such as ozone, atomic oxygen, hydrogen, chlorine etc. which greatly enhances the fluids ability to oxidize and reduce materials.

As used throughout the specification, the term fluid refers generally to gases and liquids. In certain specified examples, treatment of specific fluids including aqueous fluids and air are described though the intention is not to limit the term fluid to these species.

BRIEF DESCRIPTION OF THE DRAWINGS

The invention and related methods may be more completely understood in consideration of the following detailed description of various embodiments of the invention in connection with the accompanying drawings, in which.

Figure 1:
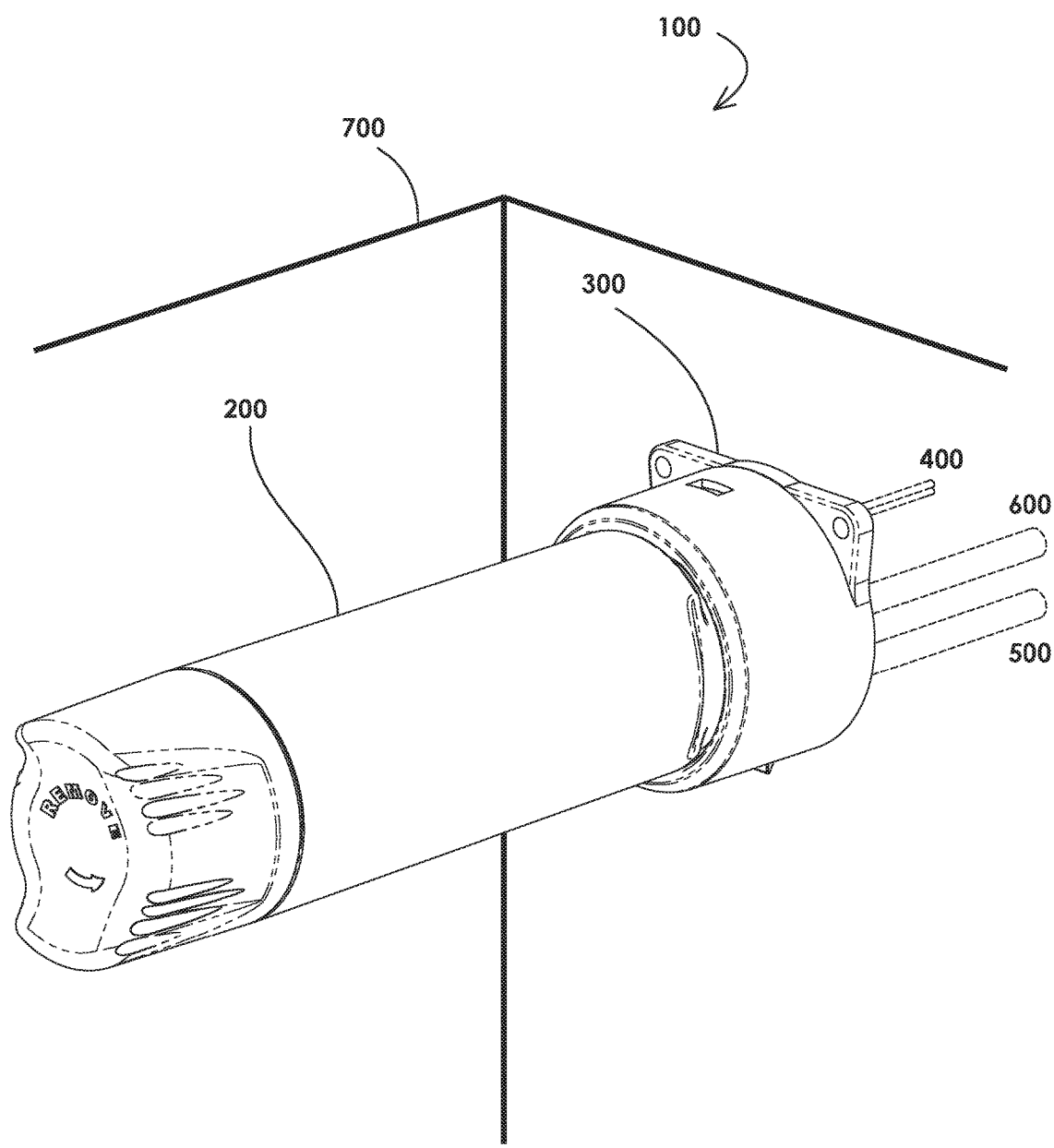
FIG. 1 is a perspective view of an embodiment of a representative electrically enhanced treatment system adapted for placement within an appliance.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE DRAWINGS

Figure 2:
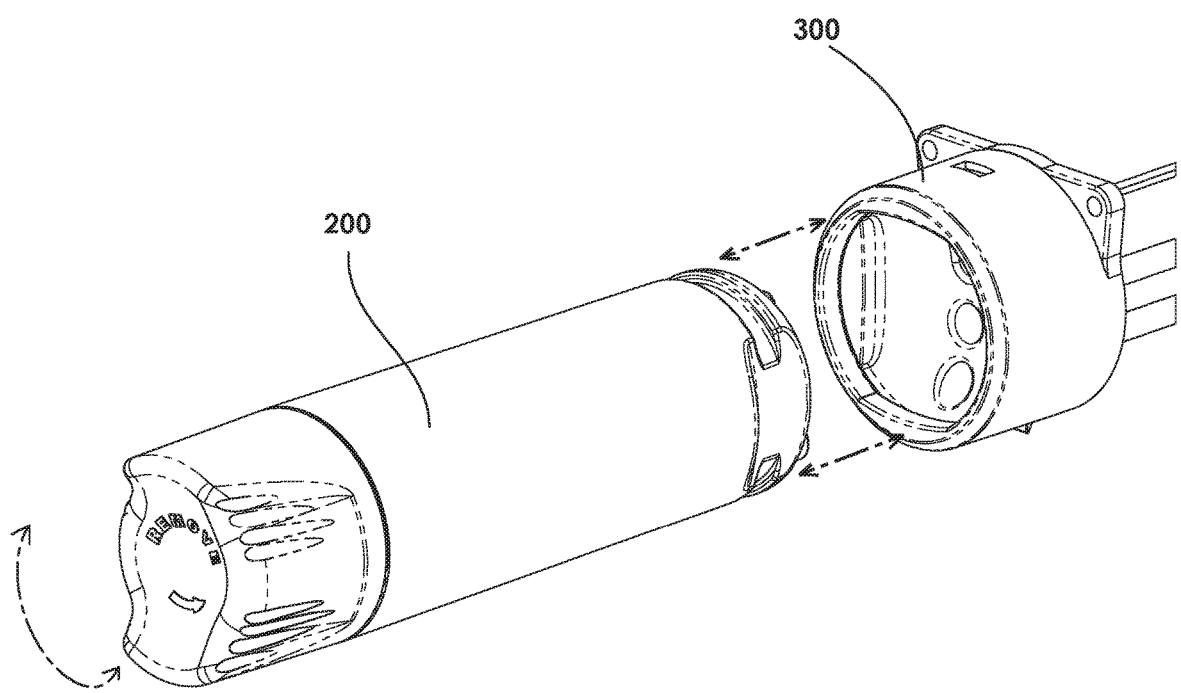
FIG. 2 is a partially exploded perspective view of the electrically enhanced treatment system of FIG. 1.

As illustrated in FIG. 1, an exemplary embodiment of an electrically enhanced treatment system 100 comprises a removably replaceable treatment cartridge 200, a manifold receiver 300 mounted to appliance 700 such as a water cooler, refrigerator, room purifier. Alternatively, manifold receiver could be similarly mounted in an under sink location such as in a home or cabin. An external voltage source 400 is connected to the manifold receiver 300 with the fluid to be treated 500 flowing into the manifold 300 and treated fluid 600 flowing out from the manifold receiver 300. As illustrated in FIG. 2, treatment cartridge 200 can be removably attached to the manifold receiver 300. In such a removable configuration, the means for attaching treatment cartridge 200 to the manifold receiver 300 can comprise a linear motion or a rotary motion, or a combination of both rotary and liner as desired to affect a robust coupling and provide for easy and fast, and clean removal.

Figure 3:
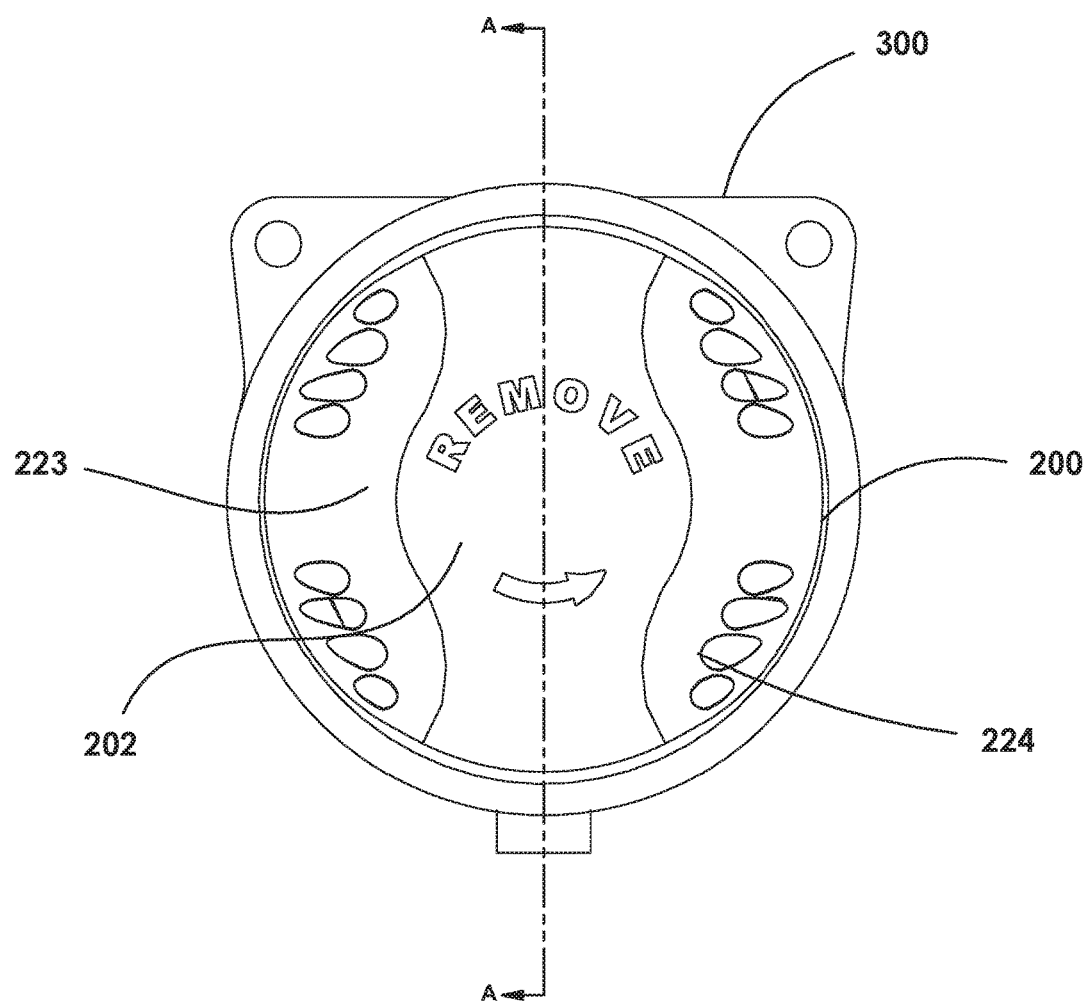
FIG. 3 is an end view of the electrically enhanced treatment system of FIG. 1.

FIG. 3 depicts an end view showing the treatment cartridge 200 and manifold receiver 300. Treatment cartridge 200 is configured for easy removal and replacement and includes means for gripping the treatment cartridge 200 with the hand and to actuate the treatment cartridge 200 in a linear or rotary motion to engage and remove the treatment cartridge 200 from the manifold receiver 300. In this respective embodiment, the treatment cartridge 200 has an end cap 202 which is sealingly connected to the treatment cartridge 200. End cap 202 can have additional gripping means such as flats or depressions 223 and/or traction grips 224 embossed or recessed in such a fashion that a user is able to impart sufficient torque by hand to rotate the treatment cartridge 200 on or off the manifold receiver 300 as may be necessary.

Various components of the electrically enhanced replaceable treatment cartridge 200 and manifold receiver 300 are illustrated in FIGS. 4-14 to demonstrate the interaction of the treatment cartridge 200 and manifold receiver 300. Electrically enhanced replaceable treatment cartridge 200 generally comprises a cartridge housing 201 sealingly mated to end cap 202 by way of threads, flanges, weldments adhesive, or the like to allow the hermetic and structural performance necessary to create a robust treatment cartridge. Cartridge housing 201 and end cap 202 may be formed of suitable materials not limited to plastics such as polypropylene (PP), polyethylene (PE), polyester, polyethylene terephthalate (PET), nylon, rigid urethane (Isoplast), polyphenylene oxide (PPO), polysulfone (PS), Acrylonitrile butadiene styrene (ABS) or even metals such as stainless steel, aluminum, brass, etc. In the event that the fluid is a gas, other materials can be considered such as, for example, cardboard, rubber, foil, polyurethane, or Mylar for example in the case of an air filter or gas mask.

Treatment cartridge 200 generally comprises at least one type of treatment media 210 and can include a second treatment media 211. Treatment media 210 and 211 can be chosen to impart specific treatment mechanism including, for example, filtration. Representative filtration media can include one or more of a set of particle filtration medias such as spun or melt blown polypropylene or polyethylene fibers, PTFE, polymer particles such as ultra-high molecular weight polyethylene UHWM-PE, HDPE, LDPE, LLDPE, ceramic materials, carbides, zeolites, diatomaceous earth, volcanic ash, manganese greensand, amorphous silicates, oxides, activated granular or powdered carbon, cellulose, wood, silica, glass fibers, paper, powdered or sintered metals such as stainless steel, titanium, zinc, copper, aluminum, iron, silver and metal oxides of ruthenium, platinum, iron, zinc, iridium, rhodium, ion exchange resins, and membranous materials such as cellulose acetate, polyamide, polysulfone, etc. Further, many of these materials are now being made available as nano-particles having much greater surface area. Generally, these materials can be arranged into active and inactive materials in reference to the adsorption or affinity to capture and reduce contaminants, but electrical enhancement of any of these materials changes their ability to capture and reduce contaminants.

In one representative embodiment, media 210/211 can be as a unitary block or fabric such that there is a matrix of structural materials, fibers, or binders which may be electrically insulating in nature. The insulating structural matrix is mixed, coated, or bound to an adsorbent media with preferably large surface areas. Further, treatment media 210 and 211 can have an electrically conductive material added to the matrix such that the adsorbent is able to be in electrical communication to the degree desired. The treatment media 210 and 211 can have the properties of an electrical conductor or even a semiconductor such that the filtration elements could conduct small amounts of current in the mA range. Treatment media 210 and 211 comprising a slight degree of conducting material such as carbon would be biased toward ionic activity and reduce or eliminate the formation of gaseous species such as oxygen and hydrogen during higher amperage electrolysis. The kinetic mechanism for the filtration process will be mostly electrostatic in nature.

In another representative embodiment, treatment media 210 and 211 can comprise a matrix of metallic particles causing the filtration element to become very electrically conductive such that the electrical activity of the element is biased to conduct larger amounts of current in the ampere range. Treatment media 210 and 211 comprising a high degree of conducting material such as metals and or their oxides would be biased toward electrolytic activity and the formation of gaseous species such as oxygen and hydrogen. The kinetic mechanism for the filtration process in this embodiment would be mostly electrodynamic in nature.

Figure 4:
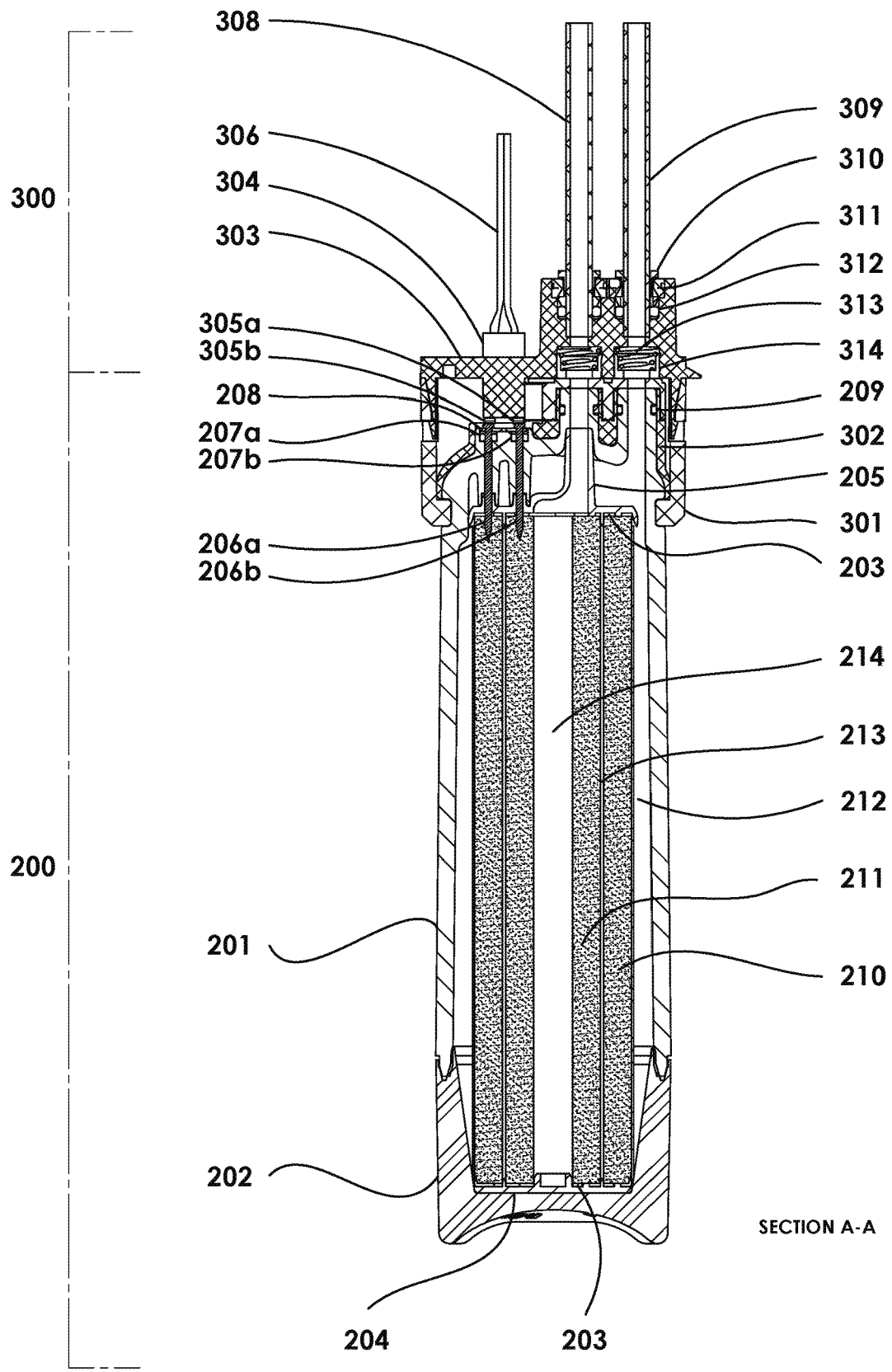
FIG. 4 is a section view of the electrically enhanced treatment system of FIG. 1 taken at line A-A of FIG. 3.

Treatment media 210 and 211 are illustrated generally in FIG. 4 as being two concentric cylinders wherein treatment media 210 is placed on the outside of filtration media 211. This geometry is suited to treatment cartridge 200 being configured in the shape of a conduit to maximize structural strength for higher fluid pressure applications. Other geometries are expected such as elliptical conduits, rectangular conduits, planar fabrics, and rolled, layered, or pleated membranes or fabrics. In the case of FIG. 4 wherein the treatment cartridge 200 is a round pipe-like shape as would be the case for a high-pressure water filter for use in an appliance such as a refrigerator, a fluid to be treated 500 is directed to first encounter region 212 just outside the surface of the treatment media 210 where the fluidic contaminants experience the polar influence of the electrical field from treatment media 210. All fluidic contaminants must then flow radially through the treatment media 210 to an interface region 213 between treatment media 210 and filtration media 211. Interface region 213 has a transitional character wherein the polarity of voltage applied to treatment media 210 is in opposition to filtration media 211 such that there is a rapid and large polarity shift in the electrical fields as the contaminants experience an opposite kinetic behavior as they pass there through interface region 213. Filtration media 211 is placed inside of treatment media 210 and is oppositely charged filtration media 211. Fluidic contaminants whether anionic or cationic in their natural fluidized state, must experience both polarity fields as they are motivated to flow through the filtration elements. Filtration media 210 and 211 need not be of the same content or species of materials or construction and will likely benefit from slight to even large differences in their make-up such that for example, the outer or first media 210 is optimized to be anodic in nature while the inner or second media 211 is optimized to be cathodic in nature or vice versa. This can be particularly beneficial depending on the type of contaminant targeted. Further, galvanic processes can be augmented or suppressed depending on the relative galvanic influence of metals or their oxides used in media construction. Even the fluidic contaminants natural ionic state, if any, can be advantageous to either erase or reduce its polarity initially, or increase its ionic charge for subsequent adsorption or entrapment as fluidic contaminates are pushed through a tortuous path through the oppositely charged medias. FIG. 4 further depicts filter media end caps 204 and 205 which serve to control the fluidic path to force the fluid to be treated 500 to flow entirely through the filter medias 210 and 211. Media end cap 204 blinds off the filter media 210 and 211 and can be constructed of an electrically insulating and fluid-proof material such as PE, PP, ABS, glass etc. Media cap 204 can be adhesively bonded to the filter medias 210 and 211 by suitable attachment means 203 including hot melt adhesive, epoxy, acrylics, latex, silicones and the like. Further, media cap 204 could be welded or even friction fit or threaded to affect a closed end as desired. Filter medias 210 and 211 can be so constructed to have blind ends by way of molding, forming, or folding and as such would not require end cap 204 or attachment means 203. In another embodiment, treatment media 210 and or 211 can be sealed by the housing 201 or end cap 202. Media cap 205 is similarly connected to filtration medias 210 and 211 with attachment means 203. Media cap 205 is configured to direct fluid flow from collector region 214 and sealingly interfaces it with the cartridge housing connection 221. Media cap 205 is further adapted to provide a conduit to guide electrical conductors 206a and 206b into the treatment media 210 and 211 respectively. Electrical conductors 206a and 206b are sealingly engaged into filter cartridge 201 with sealing means 207a and 207b wherein sealing means can be a potting compound, forced interference fit, or elastic elements such as o-rings or the like. Insulating cover 208 is optionally provided to protect sealing means 207 and limit the depth of insertion of the electrical conductors 206a and 206b into the treatment media 210 and 211 as desired.

Figure 5:
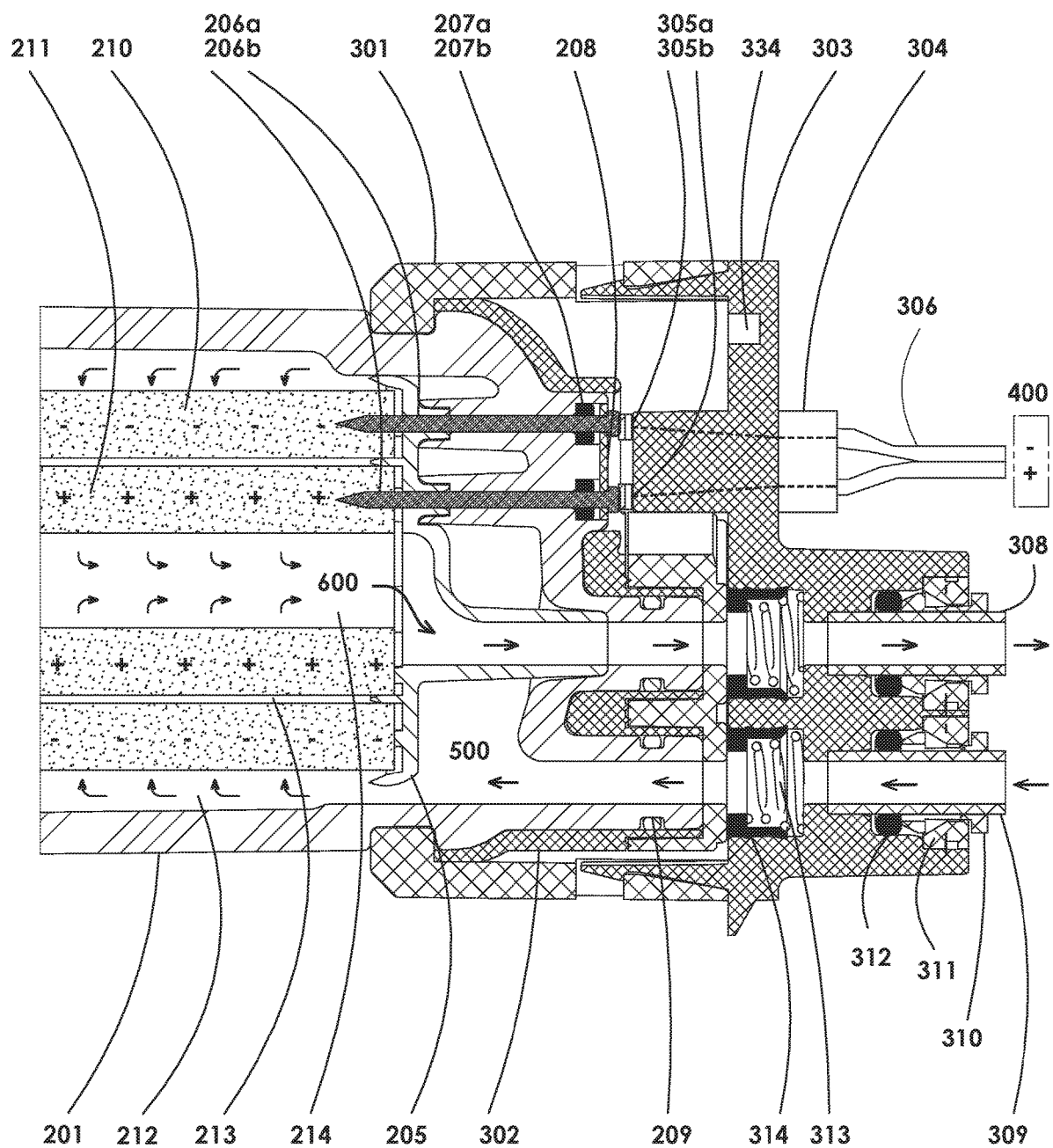
FIG. 5 is a detail section view of the electrically enhanced treatment system of FIG. 1.
Figure 25A:
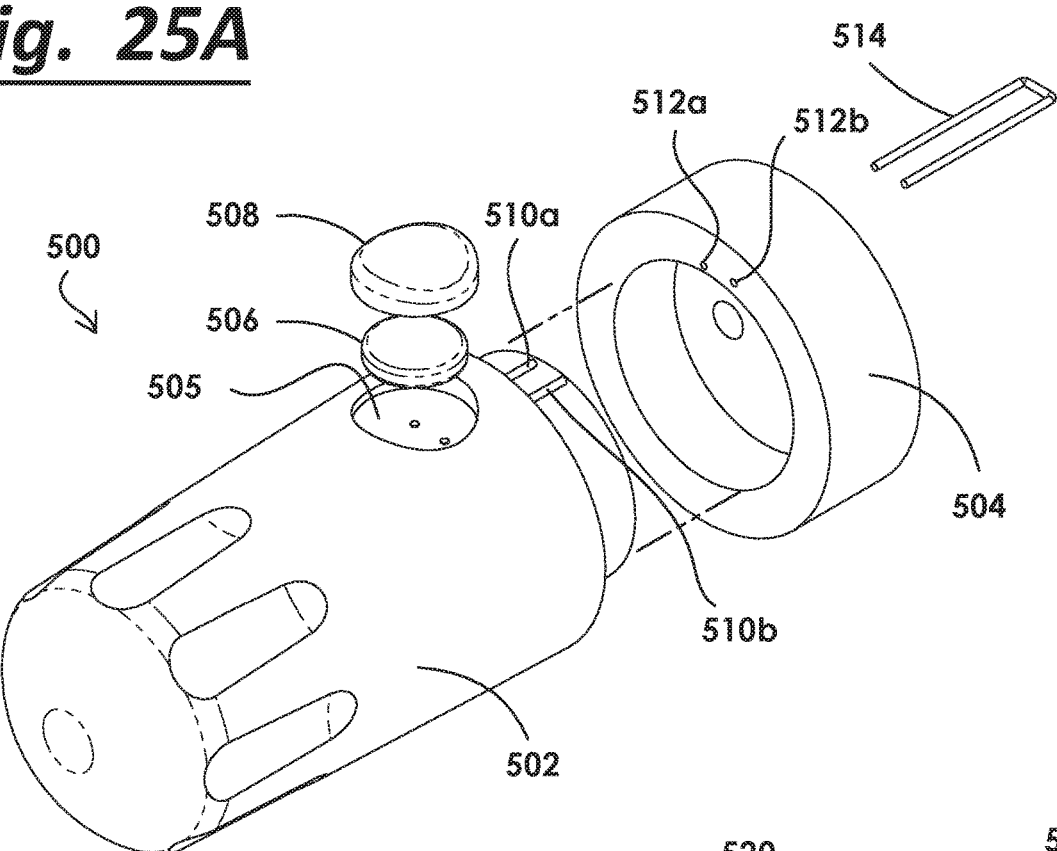
FIG. 25A is an exploded perspective view of an electrically enhanced, removably replaceable treatment cartridge according to an embodiment of the present invention.

FIGS. 3 and 4 show filtration cartridge 200 sealingly and removably engaged with manifold receiver 300 by way of a means of sealing 209 which are depicted as elastic o-rings. Sealing means 209 can be integrally formed into filter cartridge housing 201 by an interference fit or similar connection method. In this representative embodiment, manifold receiver 300 is shown comprising a manifold body 301 mechanically attached to manifold bulkhead 303 such that manifold valve body 302a and manifold rotary valve cap 302b are joined together in a fluid tight arrangement, are axially confined and allow for limited rotary motion. Alternately, manifold rotary valve body 302a and manifold rotary valve cap 302b can be of an integral design eliminating the need to join two components into one integral component. Manifold components including manifold body 301, manifold valve body 302a, manifold rotary valve cap 302b and manifold bulkhead 303 can made from plastics such as polypropylene (PP), polyethylene (PE), polyester, polyethylene terephthalate (PET), nylon, rigid urethane (Isoplast), polyphenylene oxide (PPO), polysulfone (PS), Acrylonitrile butadiene styrene (ABS) or even metals such as stainless steel, aluminum, brass, etc. The various manifold components can be all of the same or differ in materials of construction as desired with the exception that if the materials are electrically conductive, care should be taken to ensure that the electrical contacts 305a and 305b are electrically insulated. Manifold receiver serves to mate at least (1) fluid connection and is shown connecting with (2) fluid filter cartridge connections 221 and 222 to manifold receiver fluid ports 325 and 326. Fluid connection 221/325 is depicted as the outlet or treated fluid connection and correspondingly, fluid connection 222/326 is depicted as the inlet or untreated fluid connection. Sealing means 209 provides for a leak-free slidably removable connection to manifold receiver fluid ports 325 and 326. Valve piston seal 314 is energized by valve piston seal spring 313 and provides long-term energized face sealing means between manifold bulkhead 303 and manifold rotary valve 302 rotary actuations. While the embodiment depicted here infers rotary motion to establish fluid flow control, this is by way of added convenience and is not necessary to practice the benefits of electrically enhanced filtration, but serve to provide clean and easy interconnection between the treatment cartridge 200 and manifold receiver 300. Manifold bulkhead 303 is shown with connection means extending to adapt to fluid conduits 308 and 309 respectively. Inlet fluid conduit 309 is shown removably engaged to a half-cartridge assembly comprising an o-ring 312, collet 310 and cartridge 311 which is permanently pressed into manifold receiver inlet port 330. Fluid inlet conduit 309 is then pushed into half-cartridge assembly collet 310 to create a leak-proof fluid connection. The connection can be removed by pushing collet 310 while pulling fluid inlet conduit 309 outward if desired. The connection of the manifold receiver 300 to fluid conduits is shown as a semi-permanent in this embodiment, but can be integral, welded, fused, pressed, or other quick-disconnectable or permanent means as desired. FIG. 5 further illustrates electrical source 400 being in electrical communication via electrical cable 306 such that a removable connector 304 engages contacts 305a and 305b respectively, providing each of the contacts 305a, 305b with the opposite electrical polarity. Electrical contact is made or broken when manifold receiver rotary valve 302 brings filter cartridge conductors 207a and 207b into position to touch the electrical contacts 305a and 305b. Thus, when treatment cartridge 200 is engaged into receiver manifold 300 and rotated into operational position, the electrical connection between electrical source 400 and cartridge conductors 207a, 207b is completed and filter medias 210 and 211 become energized with opposite polarity. In some embodiments as shown in FIG. 25A, electrical source 400 can comprise a suitable battery 502.

FIG. 5 shows greater detail and defines more clearly the path of the untreated fluid 500 as it enters the manifold 300 and is forced around the outside of the electrically energized treatment media 210. After passing through a full polarity transition, treated fluid 600 is collected and directed out of manifold 300.

Figure 6:
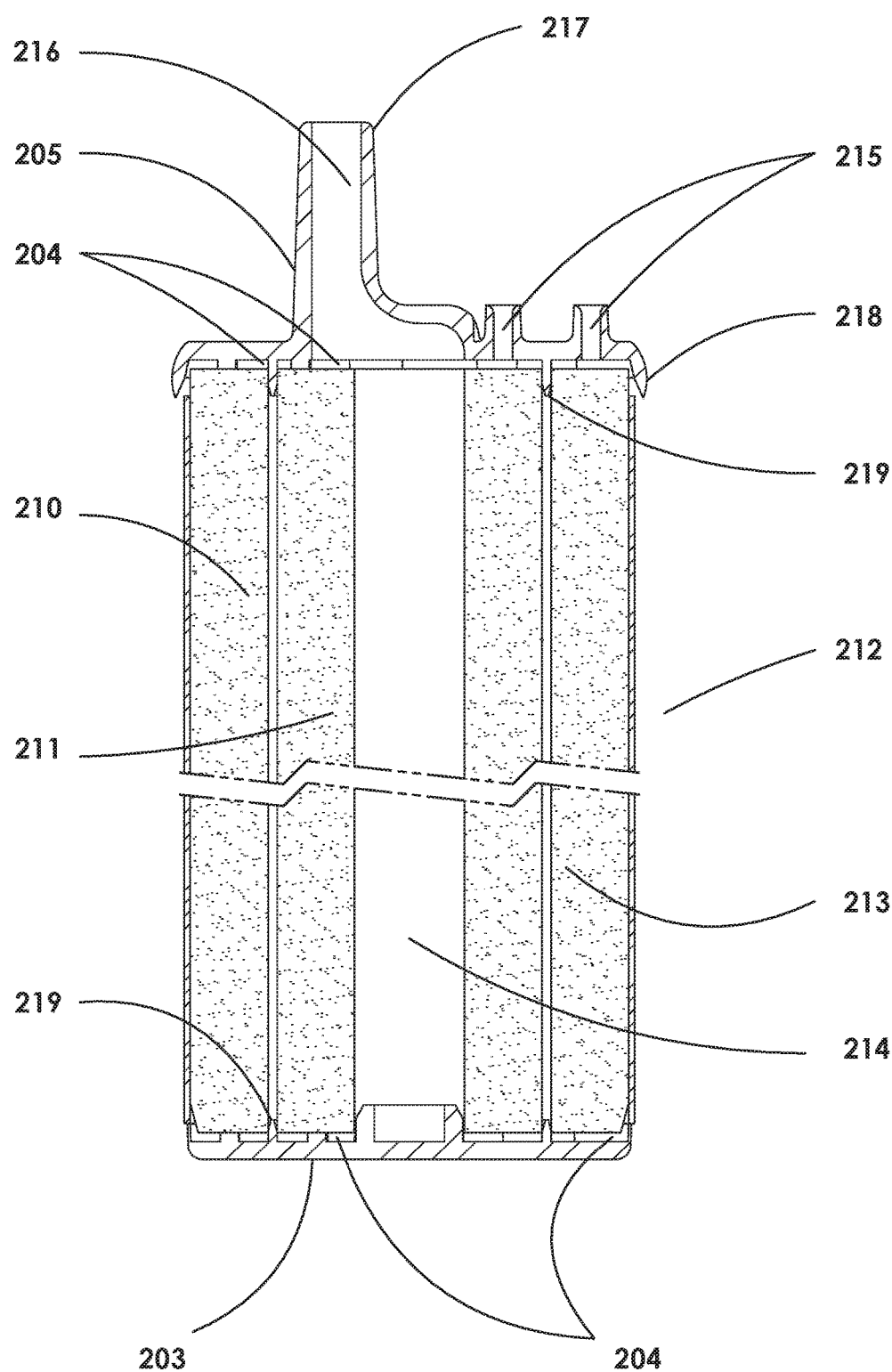
FIG. 6 is a section view of an electrically enhanced treatment element according to an embodiment of the present invention.

FIG. 6 shows a detailed cross-section of one embodiment of an electrically enhanced filtration media element. Media caps 203 and 204 show an embossed spacing and insulating ring 219 respectively to both space the filter medias 210, 211 apart to a pre-defined gap, and keep them concentric for even electrical field and fluid passage at the transition region 213. Media cap 204 is shown with centering rib 218 that allows the filtration media element to be securely positioned within the filter cartridge housing interior and allow untreated fluid to access the entire exterior surface of filtration media 210. Electrical conductor ports 215 receive and guide the conductors 206 so that they can be pressed into electrical contact with the treatment media 210 and 211 during assembly. Electrical conductor ports 215 also insulate the conductors from becoming actively engaged in electrolysis by displacing any fluids thereby reducing unwanted gas formation or galvanic corrosion on the conductors. Media cap 204 has a fluid collector 216 with fluid collector sealing means 217 which can be a friction fit, elastomeric element such as o-ring, adhesive, or integral lip as examples.

Figure 7:
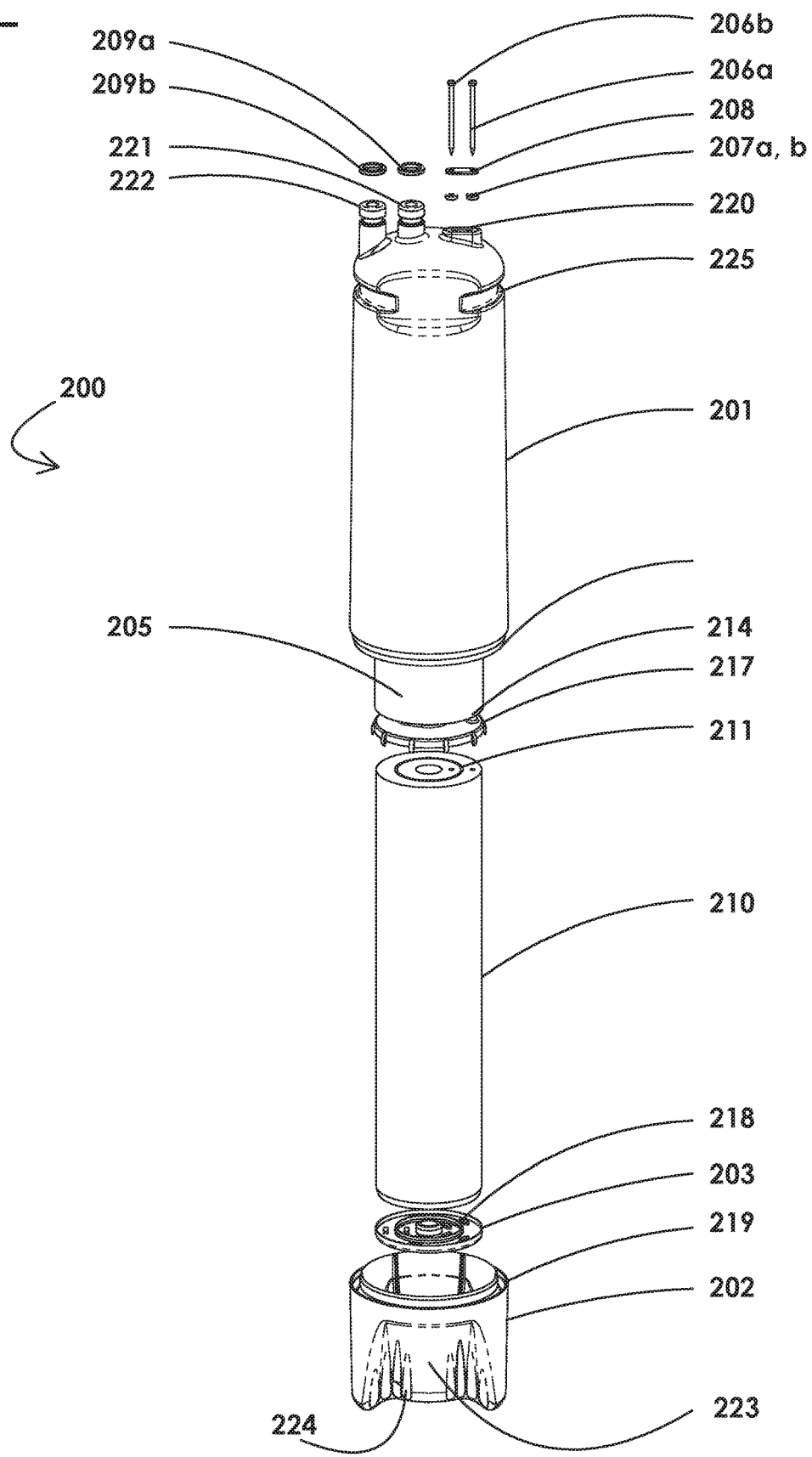
FIG. 7 is an exploded perspective view of an electrically enhanced replaceable treatment cartridge according to an embodiment of the present invention.
Figure 8:
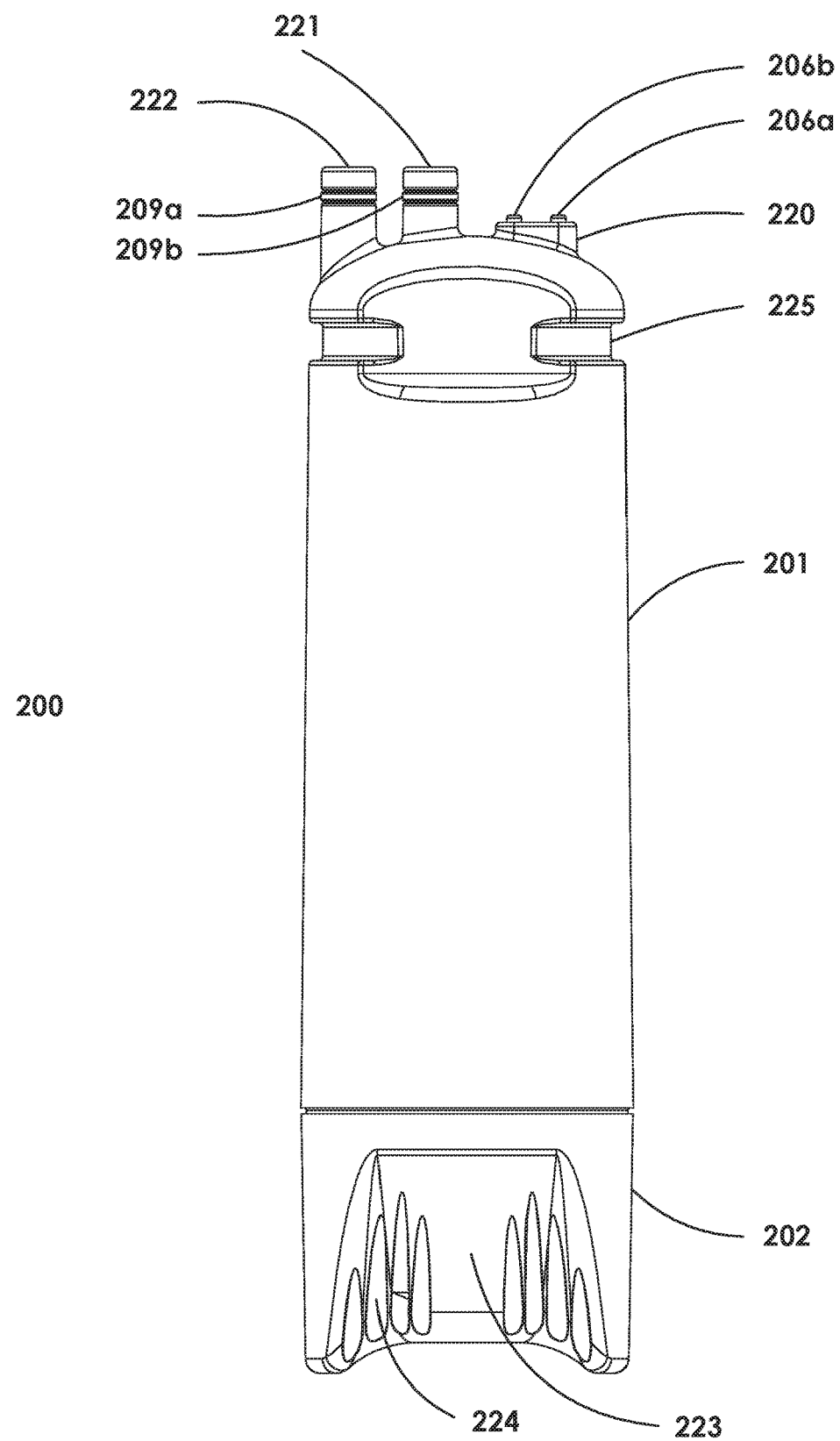
FIG. 8 is a side view of the electrically enhanced replaceable treatment cartridge of FIG.

FIGS. 7 and 8 illustrate an embodiment of a treatment cartridge 200 with a plurality of bayonet tab receivers 225. Treatment cartridge 200 can also be configured with a single bayonet tab, at least one partial helical thread, locking tabs, friction fit interference, elastic element/groove interface, locking tabs, or external clamp to hold treatment cartridge 200 into position.

Figure 9A:
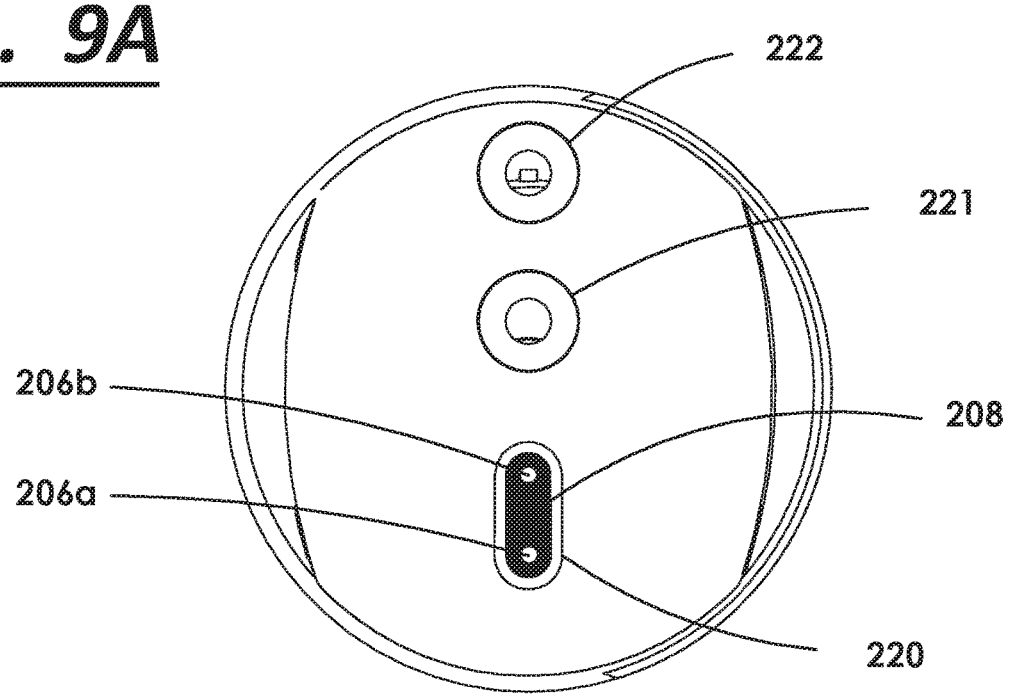
FIG. 9A is an end view of the electrically enhanced replaceable treatment cartridge of FIG. 7.
Figure 9B:
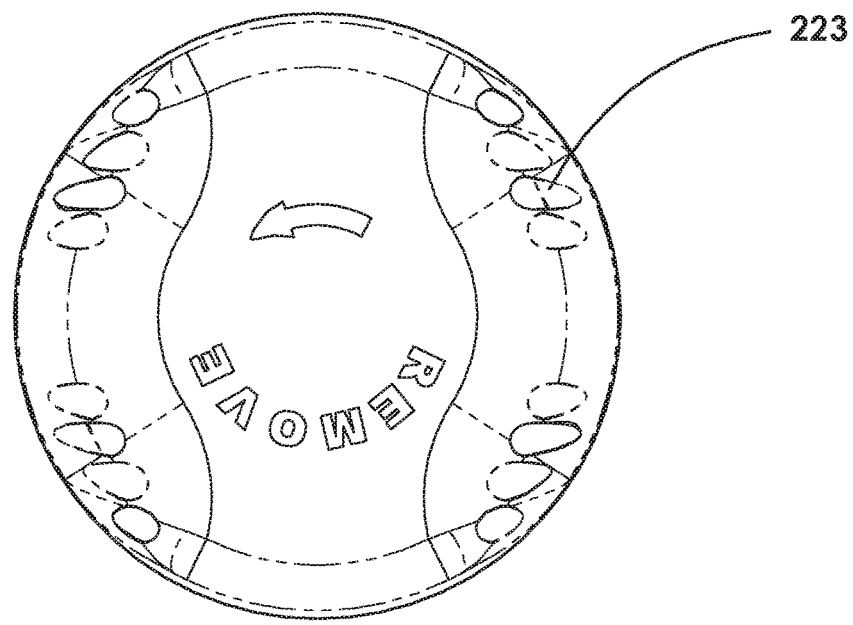
FIG. 9B is an end view of the electrically enhanced replaceable treatment cartridge of FIG. 7.

As seen in FIGS. 9A and 9B respectively, upper and lower end view illustrate treatment cartridge 200 with its twin male ports 221 and 222, and twin electrical conductors 206a and 206. As seen in the lower end view, treatment cartridge 200 can include a graphic such as the word "remove" with a corresponding directional arrow so as to illustrate and instruct a user on how to install and remove the treatment cartridge 200.

Figure 10:
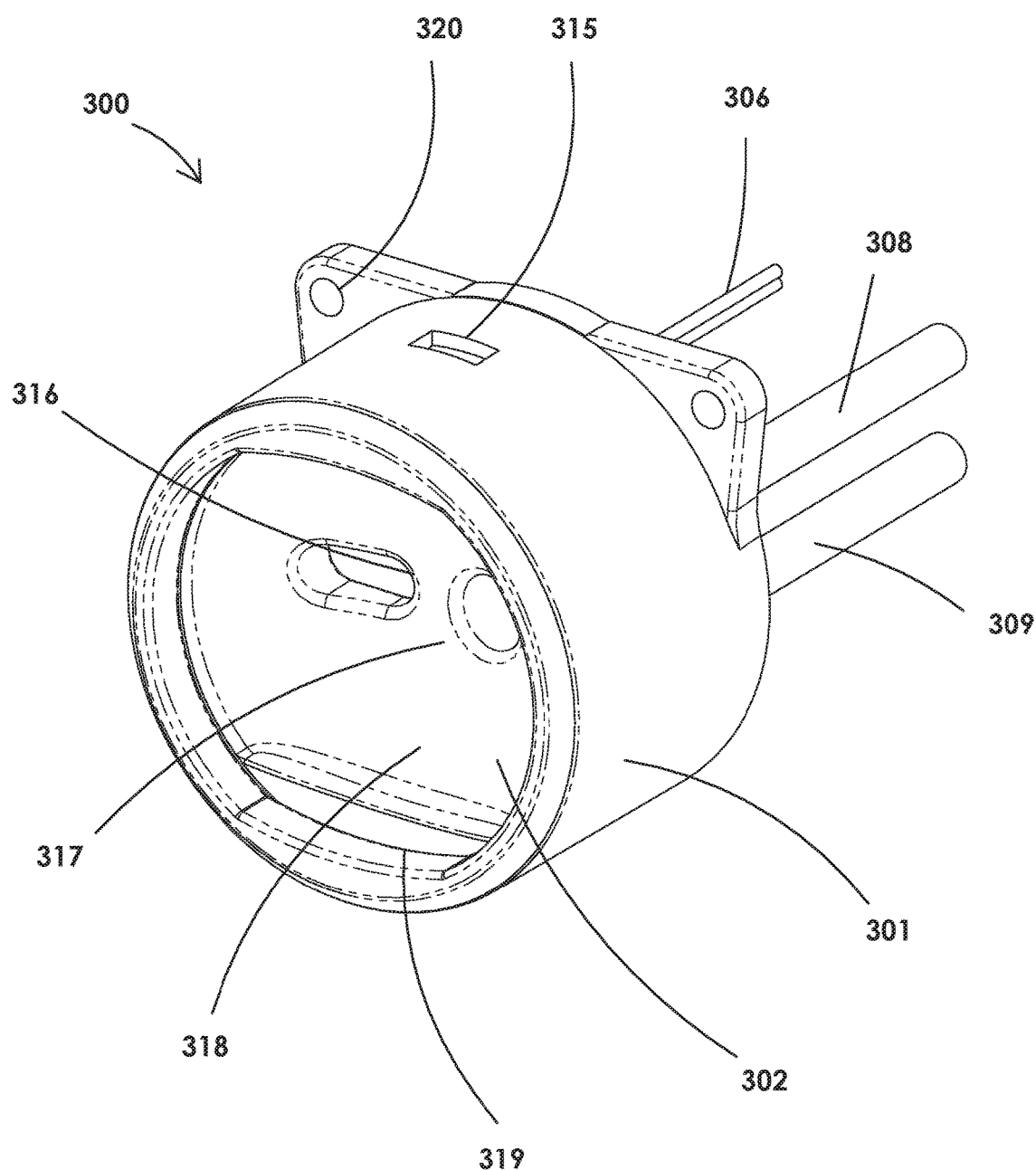
FIG. 10 is a perspective view of a manifold receiver according to an embodiment of the present invention.

FIG. 10 illustrates manifold receiver 300 with the alignment depicted for the electrical and fluid port connections as if the treatment cartridge 200 is hidden, not removed. Visible on the manifold receiver 300 are the manifold receiver inlet port 318, outlet port 317 and electrical contact port 316. Mounting means 320 for attaching the manifold receiver 300 is shown as a screw lug and locking tab port 315. The at least one bayonet tab 319 is shown engaged with the at least one bayonet tab receiver 225.

Figure 11:
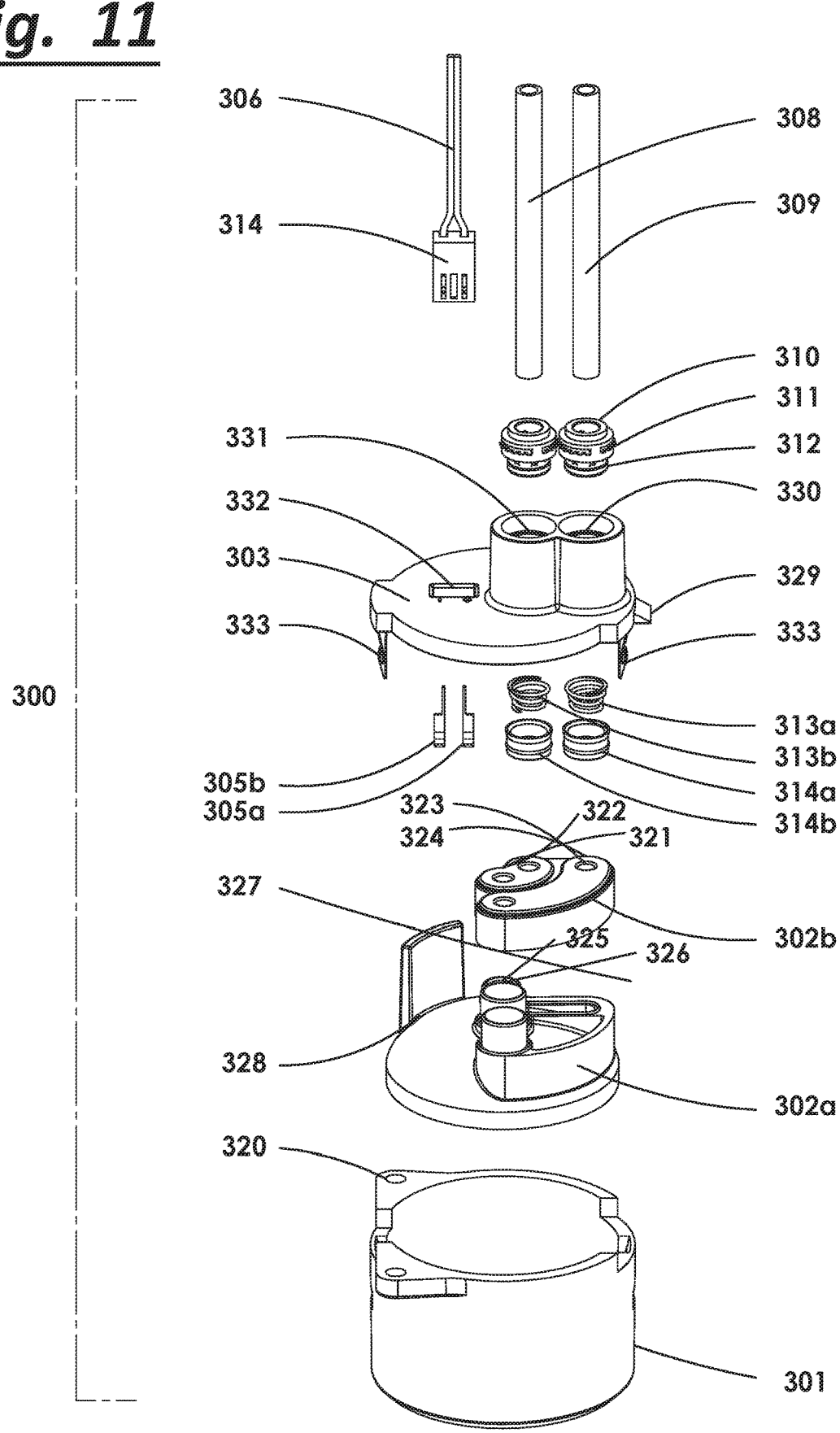
FIG. 11 is an exploded perspective view of the manifold receiver of FIG. 10.

Manifold receiver rotary valve assembly 302 is illustrated in FIG. 11 with rotary valve body 302a and rotary valve cap 302b. Rotary valve 302a and rotary valve cap 302b are illustrated as two separate components due to molding limitations but can be configured in such a manner and to impart similar functionality requiring they be joined by welding, adhesive, or even removably sealed by axially containment. Rotary valve cap 302b shows a pair of ports 322 and 321 that seal against piston faces 314a and 314b respectively. When piston faces 314a/314b are in alignment with ports 322/321, manifold receiver 300 is in fluid communication with the filtration cartridge 200 and treating the fluid 500 and producing filtered fluid 600 in a "filtration mode". When rotary valve cap 302b is aligned such that ports 323/324 are aligned with piston faces 314a/314b, the treatment cartridge 200 is removed from the inlet source of fluid to be treated 500 and instead, recirculates the untreated water 500 out conduit 310 in "bypass mode". Rotary valve 302a has a rotation limit tab 328 that engages into rotary limit slot 334 as shown in FIG. 5. Electrical contacts 305a and 305b can be inserted or even over-molded into manifold bulkhead 303. Electrical contacts are spring energized to maintain electrical conductivity over a wide operating distance and are also shown to engage the electrical connector 314 and electrical cable 306. Locking tab 333 is fitted into locking tab port 315 on FIG. 10 to assemble manifold receiver body 301 to manifold bulkhead 303.

In one representative embodiment, a rotation limit of 90 degrees can be imparted to engage and disengage the fluid valve and connect and remove the treatment cartridge 200. In another representative embodiment, the treatment cartridge 200 can be removed by rotating the receiver manifold rotary valve 302 ninety degrees counter-clockwise without engaging into "bypass mode". Rotary valve cap 302b can easily be eliminated and its reduced functionality can be integrated into the rotary valve 302a without molding limitations. The removal of ports 323 and 324 effectively eliminate fluid communication with between conduits 308 and 309 benefiting the filtration system as no untreated fluids can contaminate downstream of the manifold receiver valve in the event that a filter cartridge is to be replaced. This is a typical requirement for having a filter cartridge warrant against unwanted contamination of non-filtered toxic, hazardous, or biologically unsafe fluids when used for potable water.

Figure 12A:
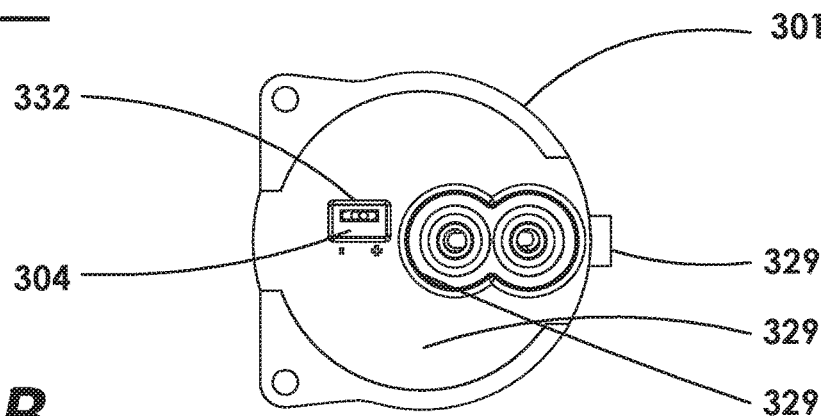
FIG. 12A is an end view of the manifold receiver of FIG. 10.
Figure 12B:
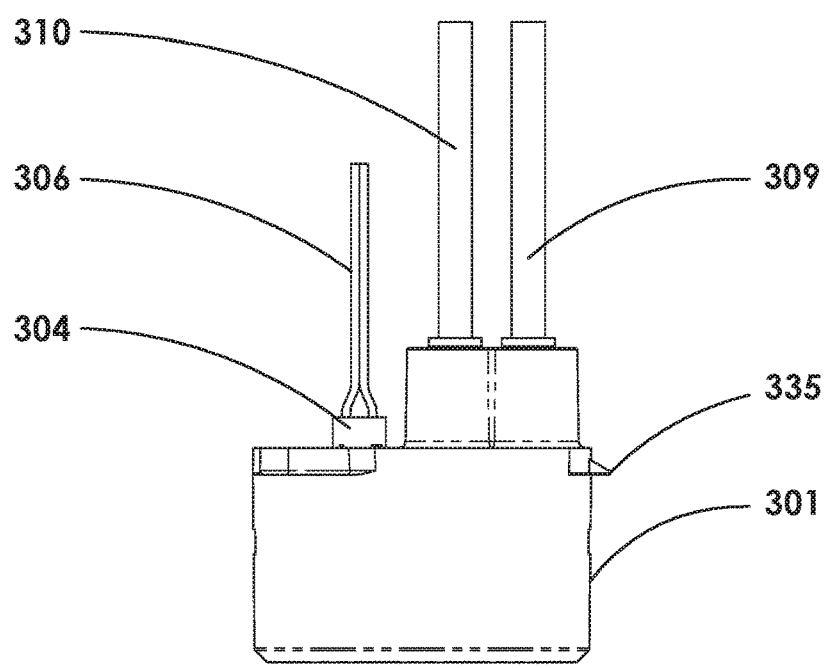
FIG. 12B is a side view of the manifold receiver of FIG. 10.
Figure 12C:
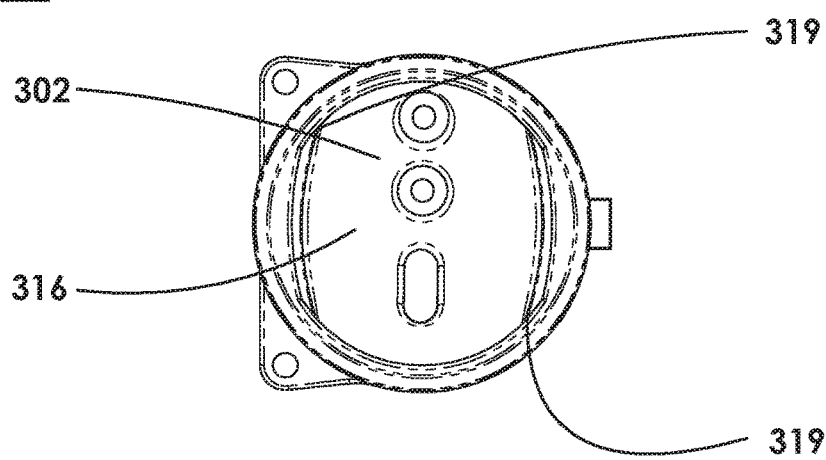
FIG. 12C is an end view of the manifold receiver of FIG. 10.

FIGS. 12A, 12B and 12C illustrate another attachment feature to enable simple installation into an appliance by way of an insert tab 335. A variety of methods can be used to provide mounting means to manifold receiver 300 such as screws, bolts, clamps, bayonet locking tabs, adhesive, snap-locking fingers, and adhesive tape as desired. Manifold receiver 300 should be mounted secure enough to ensure that the required torque and/or axial forces imparted to remove and install the treatment cartridge 200 does not dislodge the manifold receiver 300 from the appliance.

Figure 13:
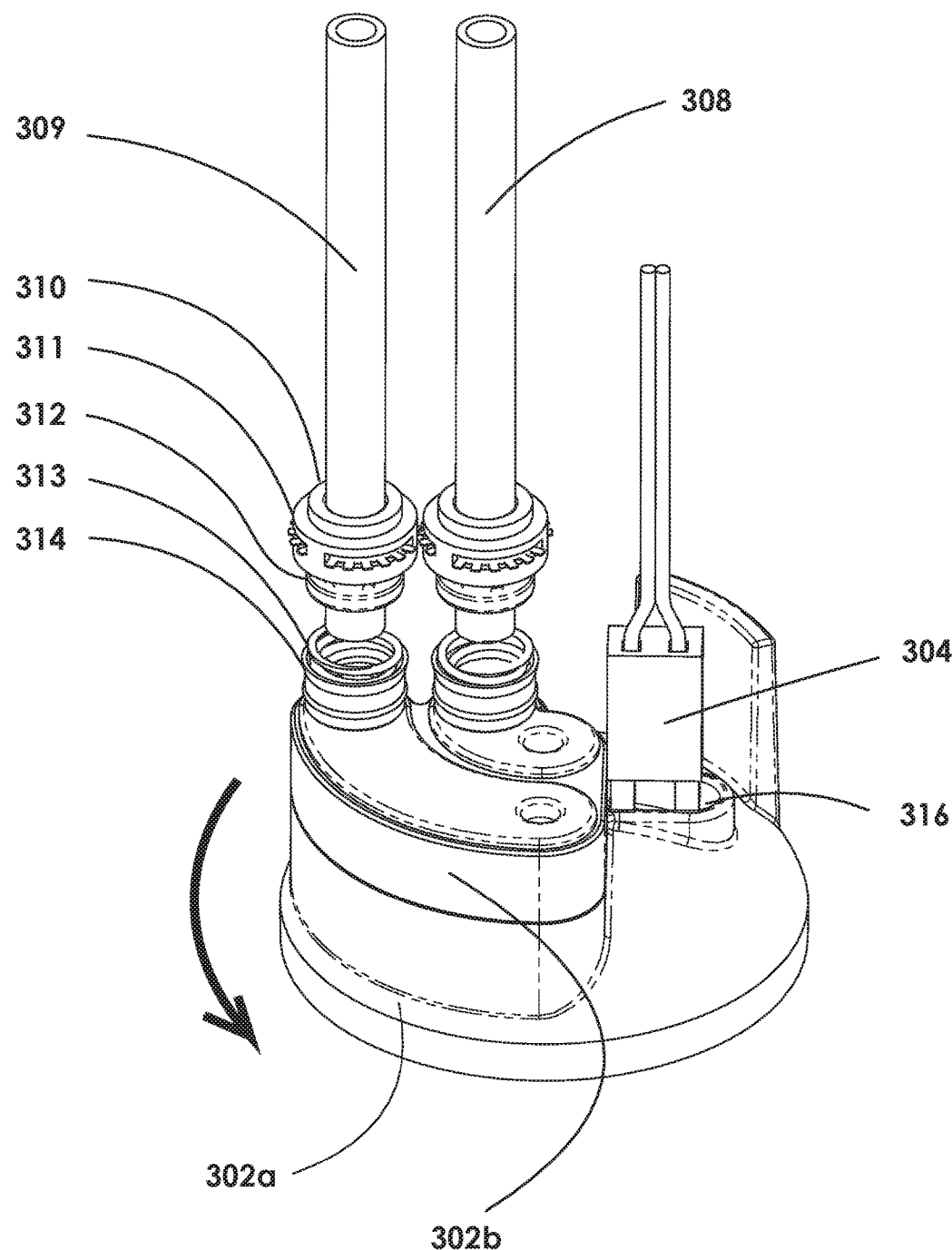
FIG. 13 is a perspective view of the manifold receiver of FIG. 10 positioned in a filtration mode.
Figure 14:
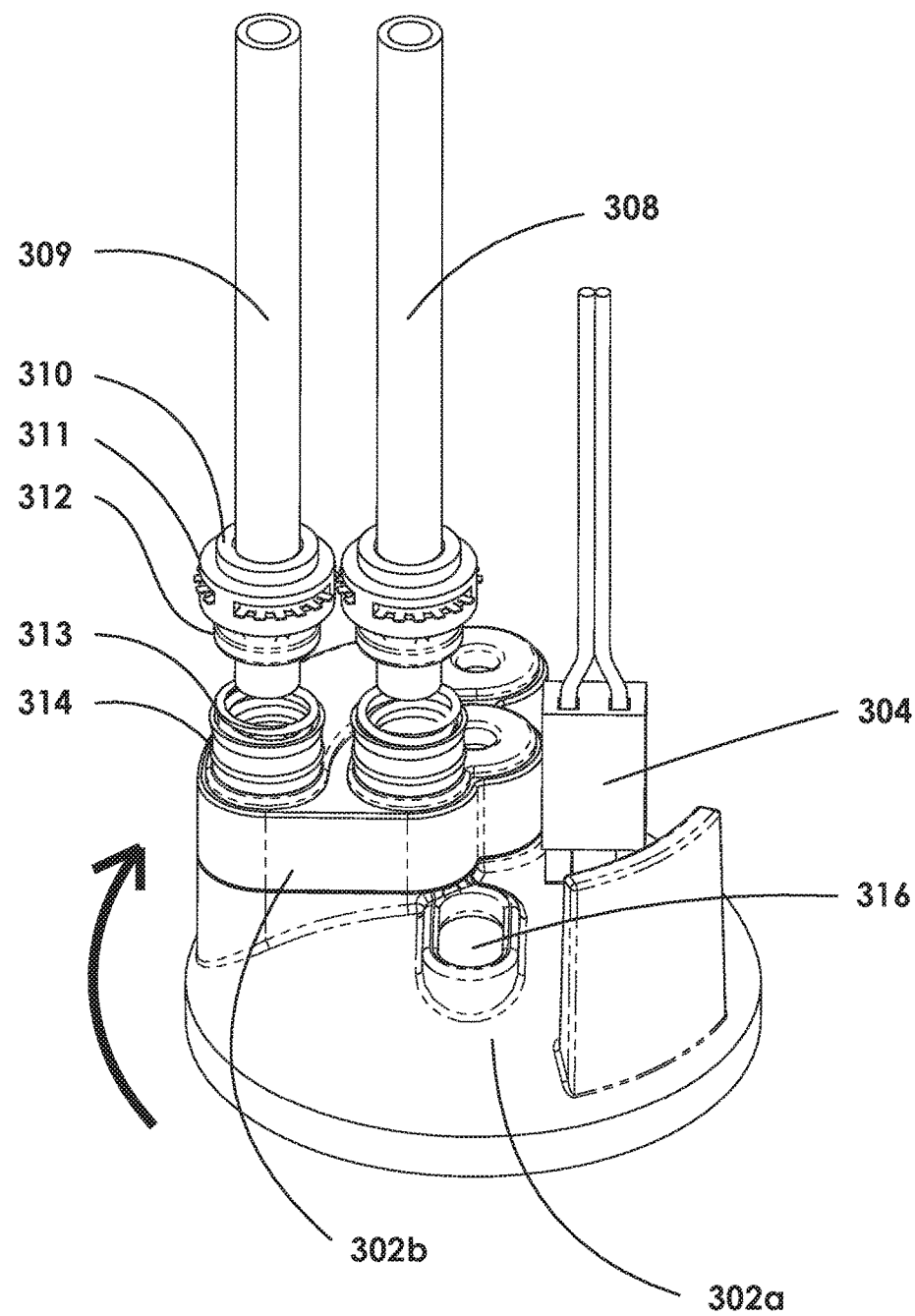
FIG. 14 is a perspective view of the manifold receiver of FIG. 10 in a bypass mode.

As seen in FIGS. 13 and 14, additional detail is provided regarding the removal of the manifold receiver body 301 and bulkhead 303. In FIG. 13, the rotary valve 302 is shown in a filtration mode with the electrical connection socket 316 in linear alignment with the electrical plug 304. FIG. 14 illustrates the rotary valve 302 in the "bypass mode" position.

Figure 15A:
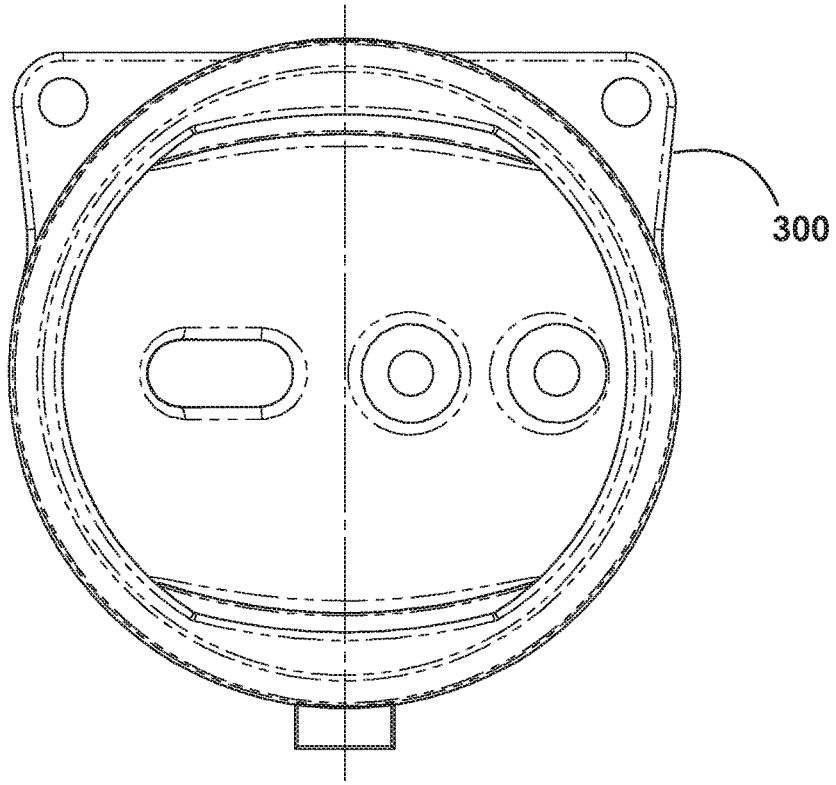
FIG. 15A is an end view of the manifold receiver of FIG. 10 illustrated in the bypass mode.
Figure 15B:
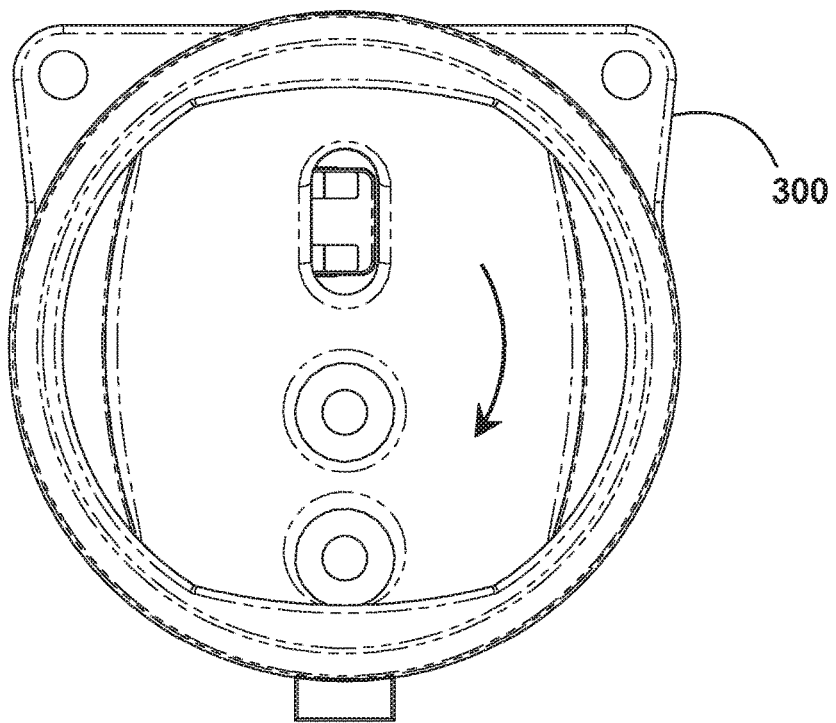
FIG. 15B is an end view of the manifold receiver of FIG. 10 illustrated in the filtration mode.

FIGS. 15A and 15B show the operation of the rotary valve feature. In FIG. 15A, the rotary valve 302 is in "bypass mode" or the valve can also be configured to be "off" such that treatment cartridge 200 can be removed or installed. In this position, no pressurized untreated fluid is allowed to flow into the filtration inlet port. A new filtration cartridge can be installed in this position and once it is inserted to full depth, clockwise rotation is enabled such that the treatment cartridge 200 engages the bayonet tab(s) in such a manner that they restrict the treatment cartridge 200 from any axial movement. As the treatment cartridge 200 is rotated beyond 45 degrees, the rotary valve begins to flood the cartridge with fluid as the treatment cartridge 200 is rotated into its locking position of 90 degree clockwise. Removal is the reverse sequence with the counter-clockwise rotation shutting-off the inlet fluid at approximately 18 degrees. At approximately 45 degrees, there is rotary valve overlap on the outlet valve port. This allows any remaining unbalanced pressure to be equalized as the treatment cartridge 200 is rotated clockwise into its removal/installation position. Additionally, the use of small port outside diameters as shown in this embodiment result in small thrust forces attempting to push the treatment cartridge 200 off of the manifold 300 during service. As an example, the O.D. of the treatment cartridge 200 can be 0.375" with an effective piston area of 0.110". Two ports of this size yield only 26 pounds separation force when fluid is pressurized to 120 psig. This value is small compared to some of the filter cartridges in operation toady with a similarly calculated 144 pounds separation force. The smaller the separation force, the less structurally robust the bayonet tab locking features need to be, and less disconnection issues result during filter removal. Additionally, the small separation forces in this embodiment provide for less removal torque and can more easily be disconnected and replaced during maintenance. This particular embodiment shows that the treatment cartridge 200 has (2) embossed fluid ports, but alternative designs can provide for two recessed ports, or one recessed and the other embossed as desired.

Figure 16:
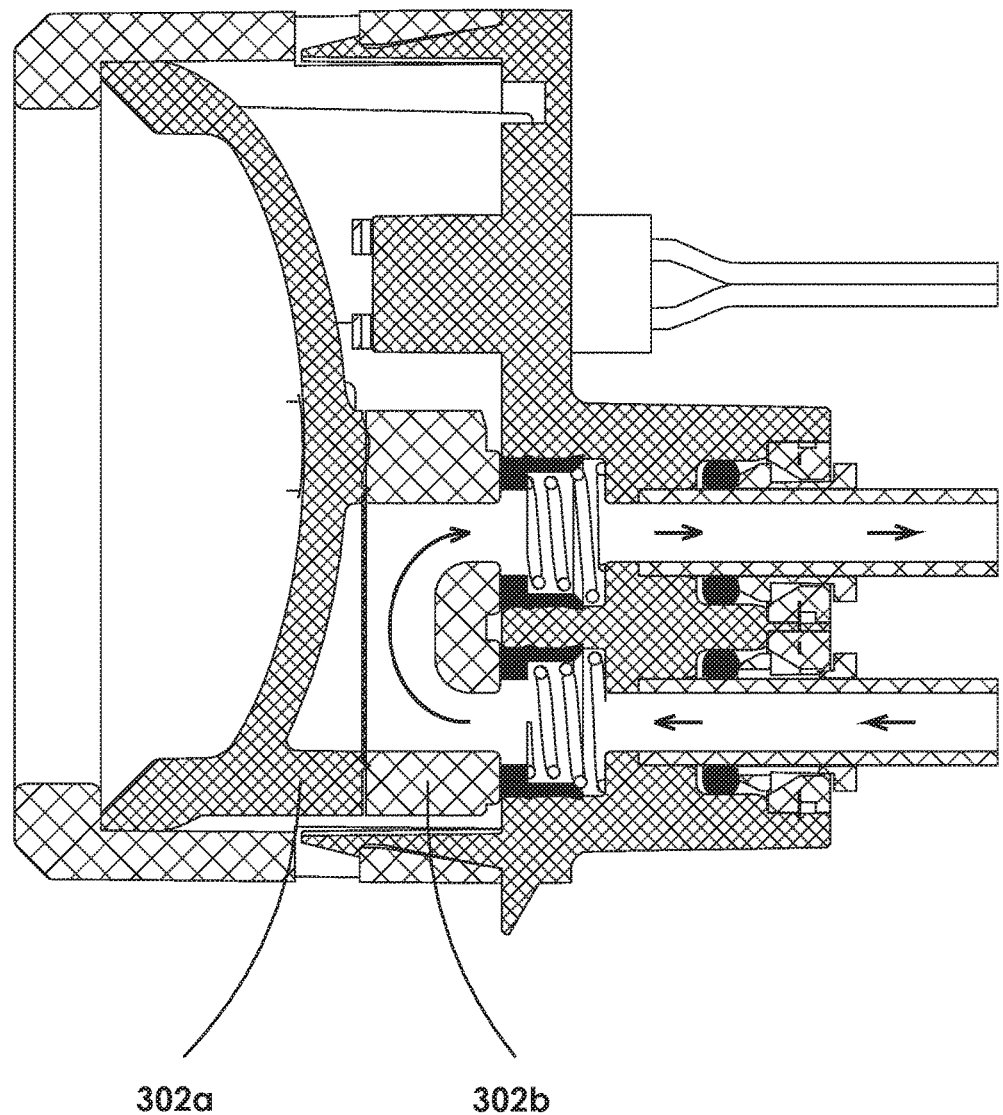
FIG. 16 is a section view of the manifold receiver of FIG. 10 illustrating fluid flow in the bypass mode.

FIG. 16 illustrates the manifold receiver 300 in a section view with the rotary valve 302 in "bypass mode". It can clearly be seen the enclosed cavity that is created by joining together rotary valve body 302*a* and rotary valve cap 302*b*.

Figure 17:
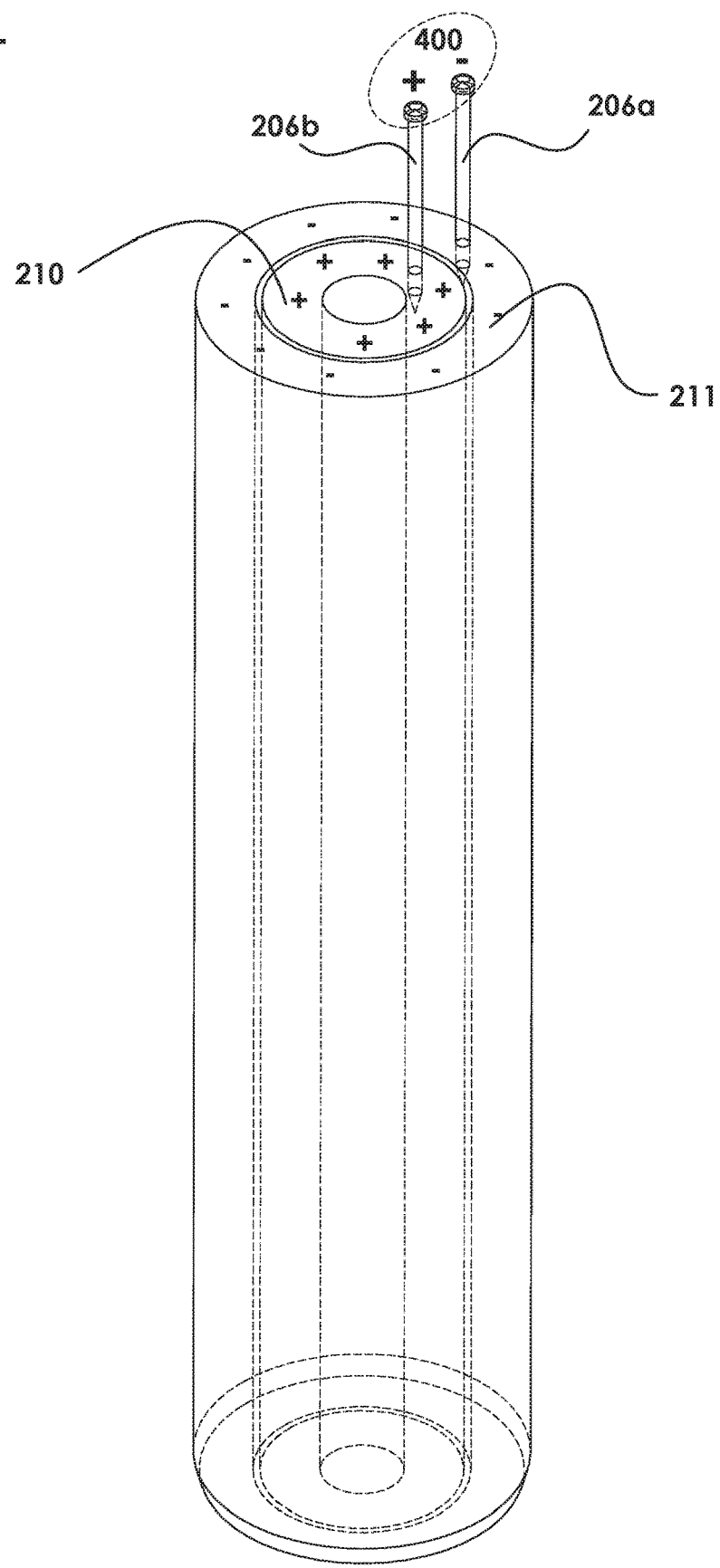
FIG. 17 is a perspective, partially hidden view illustrating a relationship of concentric treatment media and a pair of fixed polarity electrodes for use with the electrically enhanced treatment element of FIG. 6.

FIG. 17 depicts a perspective view of the dual concentric treatment media 210 and 211 with the electrical conductors 206*a* and 206*b* providing electrical communication to the filtration media 210/211. This view shows an embodiment for a round filtration cartridge, but those skilled in the art can understand that the filtration media can be arranged in other geometric patterns to suit the type of cartridge design, flat, spiral, linear, elliptical etc. The embodiment shown is considered to be the most general and practical for liquid fluid filtration. It is also well understood, that the round filtration media can be made from pleated, wound, or laminated layers of electrically conductive media that can provide increased surface areas or more intense electrically plenary charged zones. The electrical conductors 206*a* and 206*b* can be constructed from variety of conductive materials including brass, aluminum, iron, copper, silver, gold, platinum, titanium, tin and graphite. Further, the electrical conductors 206*a* and 206*b* can be coated with plating of precious metals such as gold, silver, platinum, rhodium, iridium, ruthenium, or their oxides in any combination to provide for their long-term use, or planned sacrificial activity. Titanium conductors are preferential due to its resistance to corrosion in aqueous applications. Coatings of iridium, palladium, platinum or ruthenium oxide can be used to ensure that the titanium surface is less susceptible to corrosion and passivation.

In one preferred embodiment, it is currently preferred to use a filtration media whose structural matrix is comprised of one or more sintered UHMW-PE powders ranging predominantly in the 1 to 100 micron size range and mixed with finely powdered activated carbon particles ranging predominantly from 20 to 200 microns. Further, the advent of nano-particles and their future economical availability will enable matrices with active agents 100 to 1000 times smaller in the 0.01 to 0.001 micron range. The media can also be blended with ATS to augment the adsorptive capability of the media for heavy metal removal for example in the cathodic media. The powders are vibrated, compressed, or impulsed and heated to bind them. Using this type of adsorbent filtration media leverages the unique structural behavior of the polymer matrix such that the insertion of metallic conductors is easy and provides a long-term electrical contact due to the elastic nature of the polymeric matrix. For example, extruded carbon block can be so hard and brittle, that pre-drilled holes would be necessary to install electrical conductors and their long-term electrical contact integrity would be compromised.

Similarly, for gaseous applications, such as a gas mask, a fabric consisting of PE or PP fibers can be coated or entrapped or thermally bonded with activated carbon or similar sorbent. Electrical conductors can be attached by insertion, or even melt staking as desired.

FIG. 17 shows a voltage source 400 external from the filtration media 210/211. The voltage source can range from fractions of a volt to more than 40 volts for use in personal devices or residential water etc. Raising the voltage much beyond 40 volts is somewhat problematic from a regulatory perspective. It can be said that the higher the voltage, the more intense the redox potential becomes, but smaller net voltages in the range of 1 to 5 volts can be very effective in enhancing the strength of an existing filter media to capture and hold contaminants beyond its normal ability, increase the capacity to hold these contaminates bound to the electrically enhanced filter media, and also increase the kinetics or rate of reaction of the filtering process allowing for higher flow rates without sacrificing contaminant reduction rates.

Smaller net voltages provide an opportunity for portable devices such as personal filtration of water and gases that are noxious or hazardous by connecting the device to an integrated battery. Additionally, it is prudent to determine the preferred polarity and chemical make-up of the filtration media to target a particular class of fluidic contaminants and then fix that polarity permanently. Reversal of the polarity would tend to relax or destroy the filtration cartridge grip on contaminants and the intention is that the contaminants remain bound to the media. Voltage can be applied at all times or just during fluid flow to maintain filtration integrity based upon the wide range of contaminants, fluids, and media under consideration. If full time electrical activity is desired, then formulating the filtration media to have only slight conductivity is advantageous particularly in the application of an appliance which has aqueous fluids that can be electrolyzed as high conductivity filtration media will conduct greater electrical currents and produce correspondingly large amounts of gases which require ventilation, less they produce problematic system over-pressures over time. The filtration elements described with only 10-50 mA of current at 12 VDC produce very small amounts of gasses such that they can be considered negligible and will not interfere structurally with filtration cartridge structural issues.

Figure 18:
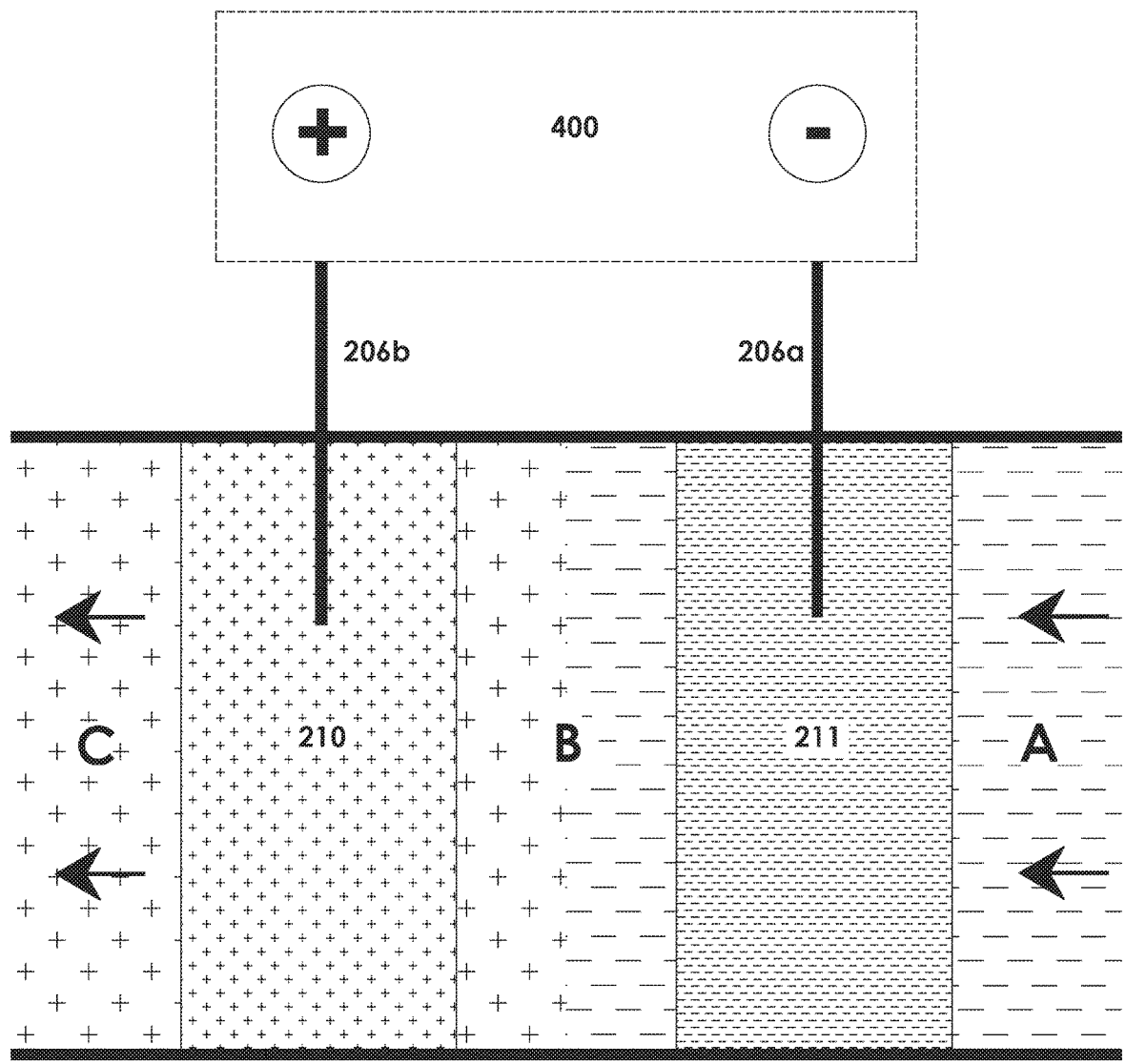
FIG. 18 is a schematic illustration depicting regions of opposite electrical charge within the electrically enhanced filtration element of FIG. 6.

FIG. 18 depicts a schematic of the general arrangement of a cross section of two electrically enhanced medias 210/211. Fluid flowing from right to left will transport contaminants into an increasingly negative polarity electrical field as they approach the boundary layer of the first negatively charged filtration media 211. The contaminant will experience this negative field and become subject to the influence of the negatively charged region A. In some cases, the zeta potential of colloidal suspensions will be altered or erased completely which causes the particles within the colloid to no longer repel each other and the colloid can collapse allowing the particles to coalesce into larger particles capable of being mechanically trapped within the pores of the filtration element. Another filtration mode exists wherein positively charged particles become electrostatically attracted to the negative charge on the surface of filtration media pore. Most pathogenic organisms have positive surface charges and interact by attraction to negatively charged surfaces. The attraction of charged particles to the opposite polarity surfaces is considered Coulomb force attraction. The surface effect is potentially very large when adsorbents such as powdered activated carbon are used. The surface area of this material can be measured to be 1500 $M^2$ per gram weight. A third filtration mode exists to galvanically plate dissolved metals into the negatively charged filtration media.

A fourth effect can occur in between region A and C, but particularly region B where aqueous fluid is in-between opposite electrical polarities. Considering that the filtration media is constructed from conductive materials such as carbon or the like, there will be current flow between the conductors if the fluid has any free ions dissolved within it. The current flow between conductors, or electrolysis, disassociates the water molecules into liberated gasses and radicals. Considering the example here, filtration media 211 acts as a cathode wherein atomic hydrogen is evolved along with hydroxyl radicals. The pH of the surrounding fluid becomes basic. Conversely, treatment media 210 acts as an anode wherein atomic oxygen is evolved along with hydrogen radicals. The pH of the surrounding fluid becomes acidic. The interaction of contaminants subject to electrolysis can cause them undergo oxidation and reduction physically changing their molecular morphology such as ferrous iron precipitating into ferric iron. The change in morphology often results in a molecule that is larger and can coalesce or agglomerate into larger particles. Also, microorganisms can be disabled within the high-energy oxidation-reduction kinetics keeping the filtration medias from becoming breeding grounds for microorganisms. The electrolysis effect is governed by the amount of conductivity of the fluid (electrolyte) and the degree of conductivity in the filtration media construction and can be minimized or maximized to tailor the response accordingly.

As the remaining contaminants are driven towards treatment media 210, any remaining negatively charged contaminates are electrostatically attracted to the positively charged treatment media 210 enhancing the native surface adsorption effect.

The distribution of electrical potential varies according to the conductivity (or resistance) of the filtration media. The strength of the voltage is highest near the conductor and diminishes as the distance increases along the filtration media. For example, if the conductor is at a +12 volt potential, the opposite end of the associated filtration media can be +5 volts as measured from the neutral point between filtration medias in region B. Also, the electrical fields will permeate the fluid well beyond the surface of the filtration into regions A and C and falls in relationship to the distance away from the potential at the exterior surface of the filtration media. Therefore, it may be necessary to provide a higher bias voltage 400 then expected to provide the necessary minimum voltage at the extremities of the filtration media. Further, since the voltage fields do extend some distance, for example, inches, the influence of region A or region C can be relatively large in scope.

Figure 19A:
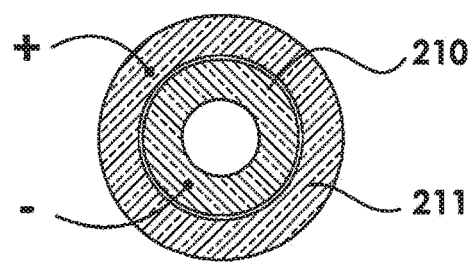
FIG. 19A is an end view of a treatment element under the influence of a pair of fixed polarity conductors according to an embodiment of the present invention.
Figure 19B:
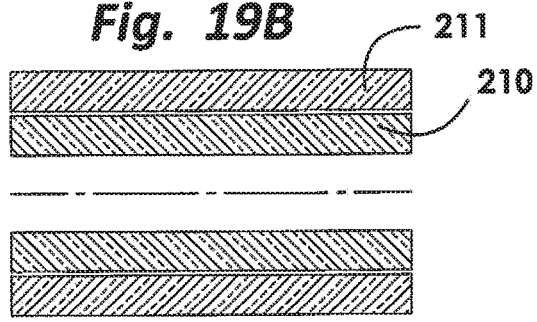
FIG. 19B is a section view of the treatment element of FIG. 19A.
Figure 20A:
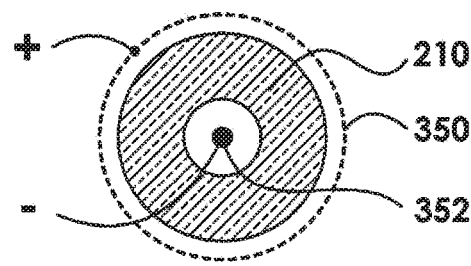
FIG. 20A is an end view of a treatment element under the influence of a pair of fixed polarity conductors according to an embodiment of the present invention.
Figure 20B:
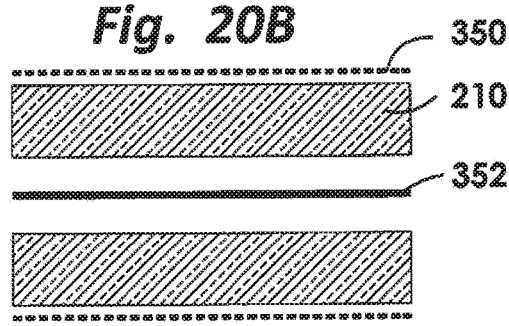
FIG. 20B is a section view of the treatment element of FIG. 20A.
Figure 21A:
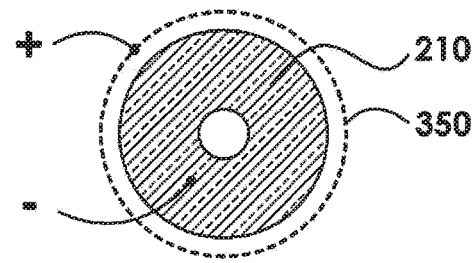
FIG. 21A is an end view of a treatment element under the influence of a pair of fixed polarity conductors according to an embodiment of the present invention.
Figure 21B:
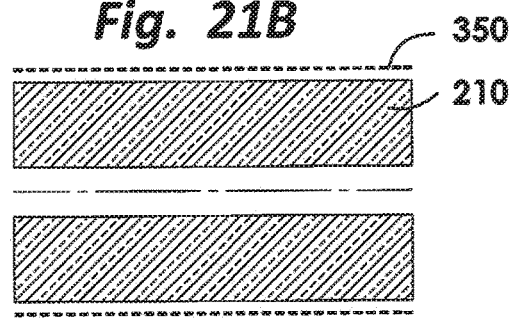
FIG. 21B is a section view of the treatment element of FIG. 21A.
Figure 22A:
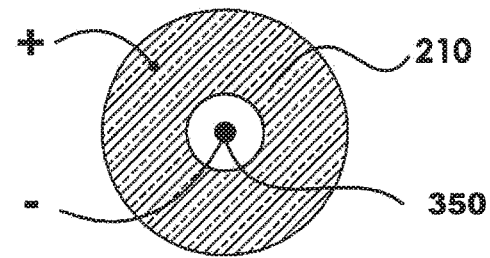
FIG. 22A is an end view of a treatment element under the influence of a pair of fixed polarity conductors according to an embodiment of the present invention.
Figure 22B:
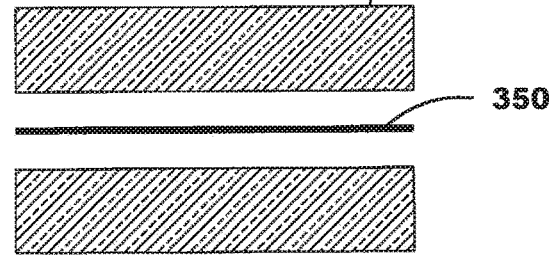
FIG. 22B is a section view of the treatment element of FIG. 22A.
Figure 23A:
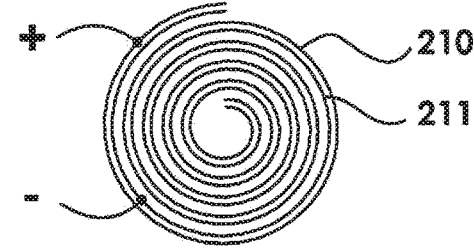
FIG. 23A is an end view of a treatment element under the influence of a pair of fixed polarity conductors according to an embodiment of the present invention.
Figure 23B:
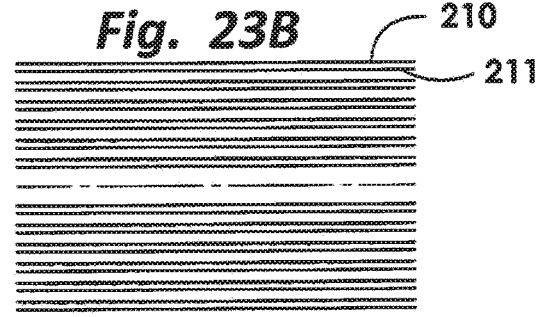
FIG. 23B is a section view of the treatment element of FIG. 23A.

FIGS. 19A-23B depicts section views for a variety of arrangements of electrically enhanced media geometries. In each case, the schematic is depicted for a cylindrically shaped cartridge with fluid flowing radially from the outside wall to the center which will transport contaminants from one fixed polar electrical field (negative or positive) to at least one polar opposing electrical field as the fluid then reaches the center and exits the filtration cartridge. It should be understood in FIGS. 19A-23B, that schematically, the + sign or the − sign are arbitrarily chosen and remain consistent through schematics A-E. Further, this invention is not specifically directed at cylindrically arranged filtration media geometries. Flat, arched, pleated, alternating, granular, or layered filtration media is also anticipated. Each cylindrical schematic has also its linear view for increased clarity. FIGS. 19A and 19B illustrate a treatment cartridge 200 having two electrically enhanced media elements which are oppositely connected to a voltage source wherein each media element is directly in electrical contact with the voltage source. FIGS. 20A and 20B illustrate a treatment cartridge 200 with one electrically enhanced media element which is set between two opposing electrical conductors such that the influence of the electrical field induced by the conductors directly polarizes the media element by proximity. The outer conductor 350 shown as a cylindrical conducting sleeve has a circumferential field whereas a center conductor 352 can comprise a rod or similar conducting surface. FIGS. 21A and 21B illustrate one electrically enhanced media element which is disposed inward of the outer conductor 350, whereas FIGS. 22A and 22B show one electrically enhanced media element which is disposed outward of the center conductor 350. FIGS. 23A and 23B illustrate a treatment cartridge 200 having multiple regions of polarity which can be achieved by multiple concentric media elements or a continuous material that is rolled or layered as in a spiral or alternating construction. The electrically enhanced media of an alternating construction can have more than one layer of media and insulation as desired with inside and outside layers of differing materials as desired.

Figure 24:
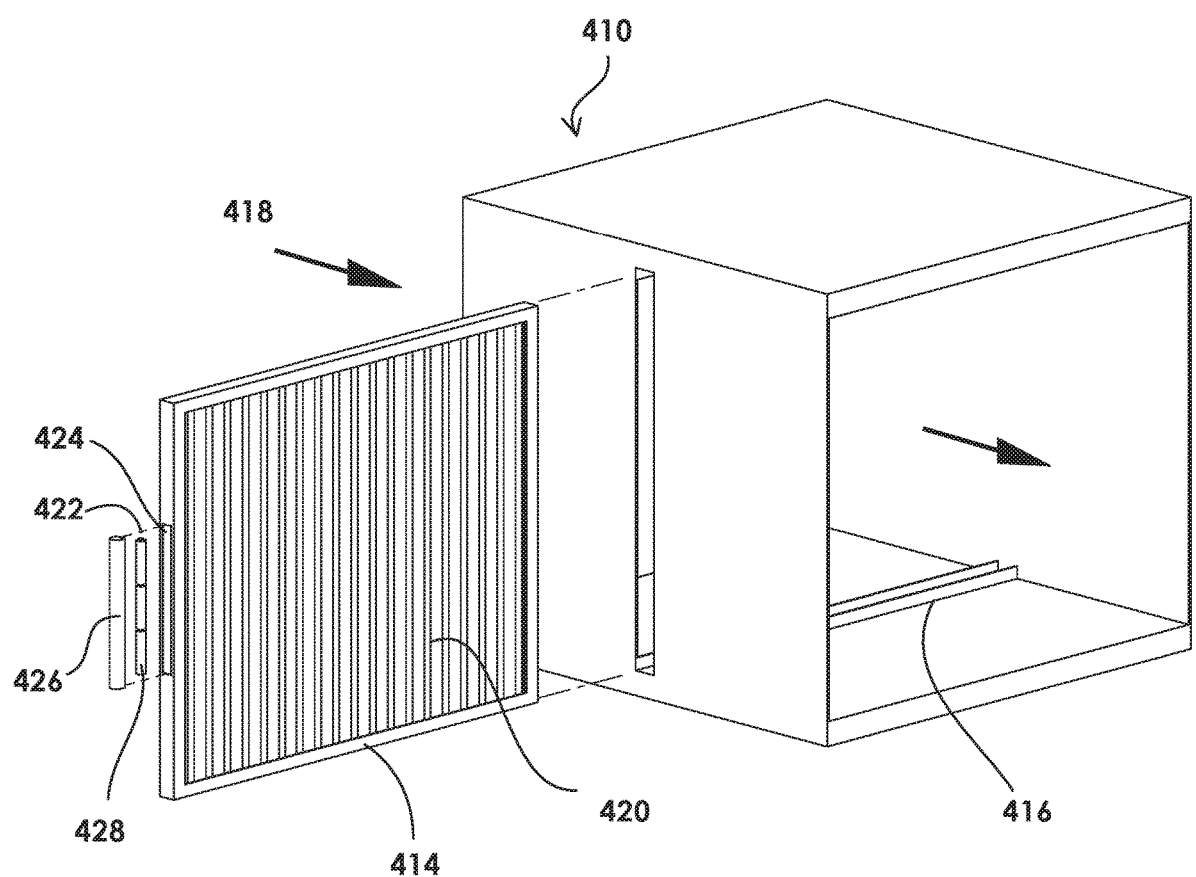
FIG. 24 is a perspective view of replaceable air treatment system according to an embodiment of the present invention.

As illustrated in FIG. 24, the concepts of electrically enhancing treatment media can be similarly applied to a gaseous fluid such as, for example, air. A representative embodiment of an air treatment system 410 can comprise a housing 412 and a replaceable treatment cartridge 414. As depicted, housing 412 can comprise a portion of air duct including a mounting track 416 for retaining the treatment cartridge 414. In one representative example, housing 412 can be mounted upstream of a furnace for treating an inlet air supply 418 to the furnace. Treatment cartridge 414 can include traditional fiber blown or pleated filter media 420. Treatment cartridge 414 can be configured to be directly replaceable with traditional furnace style filters and as such, can include an integrated energy source 422 within the treatment cartridge 414. As shown in FIG. 24, treatment cartridge 414 can comprise a battery compartment 424 enclosed by a battery cover 426. The integrated energy source 422 can comprise one or more batteries 428 that are received and retained within the battery compartment 424.

Figure 25B:
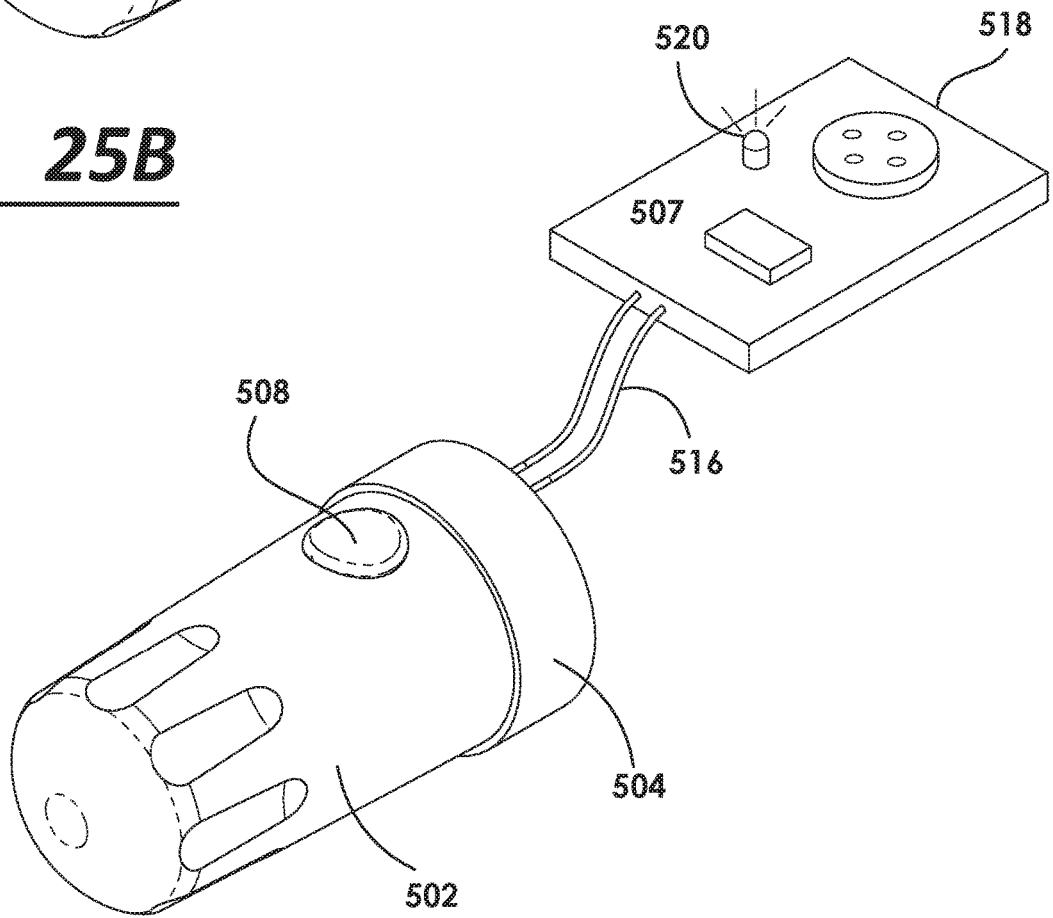
FIG. 25B is a perspective view of an electrically enhanced treatment system according to an embodiment of the present invention.

As illustrated in FIGS. 25A and 25B, the concept of including an integrated energy source can be similarly applied to an electrically enhanced treatment system 500 that is configured for treating liquid fluids such as, for example, aqueous fluids. Electrically enhanced treatment system 500 can comprise a treatment cartridge 502 that is axially attached to a manifold receiver 504. Treatment cartridge 502 can include a battery compartment 505, a battery 506 and a battery cover 508. In an embodiment as illustrated in FIG. 25A, treatment cartridge 502 can include a pair of projecting contacts 510a and 510b that are axially insertable into a pair of contact bores 512a, 512b on the manifold receiver 504. When treatment cartridge 502 is coupled to manifold receiver 504, power is communicated from the battery 506 to the manifold receiver 504 through the projecting contacts 510a, 510b. In the manifold receiver 504, the power is communicated back to the treatment media within the treatment cartridge 502 using electrical conductor 514. In this manner, the electrically circuit is complete only when the treatment cartridge 502 is operably coupled to the manifold receiver 504 so as to prevent accidental discharge of battery 506. As illustrated in FIG. 25B, the electrically enhanced treatment system 500 can further include a control circuit 516 including a controller 518. Controller 518 can comprise control elements such as, for example, lights, switches, relays and/or a processor to provide additional functionality to the electrically enhanced treatment system 500. For example, a light 520 can be lit when treatment cartridge 502 is due for replacement. Alternatively, controller 518 can open and close the electrical circuit to the electrical conductor 514 such that power is supplied from the battery 506 only when water is flowing through the electrically enhanced treatment system 500.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

The invention claimed is:

1. A fluid treatment system, comprising:
a manifold defining a fluid inlet conduit and a fluid outlet conduit, the manifold further including an external electrical source; and
a treatment cartridge including a media sealed within a cartridge housing, the treatment cartridge including a fluid inlet connection and a fluid outlet connection, the treatment cartridge further including a cartridge electrical connection having a pair of electrical conductors,
wherein engagement of the treatment cartridge with the manifold defines both a system fluid conduit and an electrical circuit, the system fluid conduit defined by interconnecting the fluid inlet conduit with the fluid inlet connection and the fluid outlet conduit with the fluid outlet connection, and the electrical circuit completed between the external electrical source and the cartridge electrical connection.

2. The fluid treatment system of claim 1, further comprising:
a controller defining a control circuit in communication with the electrical circuit, the controller selectively controlling the electrical circuit.

3. The fluid treatment system of claim 2, wherein the controller comprises a processor.

4. The fluid treatment system of claim 1, wherein the cartridge electrical connection provides access to a housing interior defined within the cartridge housing and a cartridge end cap.

5. The fluid treatment system of claim 4, wherein the cartridge electrical connection, the fluid inlet connection and the fluid outlet connection extend through the cartridge housing.

6. The fluid treatment system of claim 5, wherein the cartridge housing engages the manifold to complete the system fluid conduit and the electrical circuit.

7. The fluid treatment system of claim 6, wherein the cartridge housing engages the manifold in a first linear direction and a second rotary direction.

8. The fluid treatment system of claim 7, wherein the system fluid conduit and the electrical circuit are completed as the cartridge housing engages the manifold in the second rotary direction.

9. The fluid treatment system of claim 1, wherein the treatment cartridge engages the manifold in a first linear direction and a second rotary direction.

10. The fluid treatment system of claim 9, wherein the bypass mode and the treatment mode are offset by a 90 degree rotation of the treatment cartridge.

11. The fluid treatment system of claim 9, wherein the electrical circuit is defined with the rotary valve rotated to a treatment mode.

12. The fluid treatment system of claim 1, wherein the manifold further comprises a rotary valve, said rotary valve operating between a bypass mode wherein fluid flow through the system fluid conduit is prevented and a treatment mode wherein fluid flow is allowed through the system fluid conduit.

13. The fluid treatment system of claim 12, wherein the treatment cartridge can be directed in the first linear direction with the rotary valve rotated to the bypass mode.

14. The fluid treatment system of claim 1, wherein the external electrical source comprises a battery.

15. An appliance comprising the fluid treatment system of claim 1.

16. A fluid treatment system, comprising:
a manifold defining a fluid inlet conduit, a fluid outlet conduit and rotary valve, the manifold further including an external electrical source; and
a treatment cartridge including a media sealed within a cartridge housing, the treatment cartridge including a fluid inlet connection and a fluid outlet connection, the treatment cartridge further including a cartridge electrical connection having a pair of electrical conductors,
wherein the rotary valve is rotatable between a bypass mode and a treatment mode, said treatment mode defining a system fluid conduit and an electrical circuit, the system fluid conduit defined by interconnecting the fluid inlet conduit with the fluid inlet connection and the fluid outlet conduit with the fluid outlet connection, and the electrical circuit completed between the external electrical source and the cartridge electrical connection.

17. The fluid treatment system of claim 16, wherein the treatment cartridge engages the manifold in a first linear direction and a second rotatable direction and wherein the bypass mode and the treatment mode are defined in the second rotatable direction.

18. The fluid treatment system of claim 17, wherein the bypass mode and the treatment mode are offset by 90° degrees along the second rotatable direction.

19. The fluid treatment system of claim 16, wherein the cartridge electrical connection accesses an interior of the treatment cartridge.

20. An appliance comprising the fluid treatment system of claim 16.

* * * * *